US010801359B2

(12) United States Patent
Blakeman et al.

(10) Patent No.: US 10,801,359 B2
(45) Date of Patent: Oct. 13, 2020

(54) METHOD AND SYSTEM FOR IDENTIFYING RUB EVENTS

(71) Applicant: General Electric Company, Schenectady, NY (US)

(72) Inventors: Lance Kenneth Blakeman, Mason, OH (US); Brian Francis Nestico, Loveland, OH (US); Peter Thomas Gibbs, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 324 days.

(21) Appl. No.: 15/458,402

(22) Filed: Mar. 14, 2017

(65) Prior Publication Data
US 2018/0266269 A1 Sep. 20, 2018

(51) Int. Cl.
*F01D 21/00* (2006.01)
*G01M 15/14* (2006.01)
(Continued)

(52) U.S. Cl.
CPC ............ *F01D 21/003* (2013.01); *F01D 5/12* (2013.01); *F01D 9/04* (2013.01); *F01D 11/14* (2013.01);
(Continued)

(58) Field of Classification Search
CPC . F01D 21/003; F01D 9/04; F01D 5/12; F05D 2220/323
See application file for complete search history.

(56) References Cited

U.S. PATENT DOCUMENTS 4,615,008 A * 9/1986 Rosenbush ............... G07C 3/00
  701/100
4,625,280 A * 11/1986 Couch .................... F01D 21/003
  701/100

(Continued)

FOREIGN PATENT DOCUMENTS

CN  103133145 A  6/2013
CN  205206884 U  5/2016
GB    2508059 A  5/2014

OTHER PUBLICATIONS

Yin, Yibing & Cai, Jing & Zuo, Hongfu & Mao, Huijie & Fu, Yu & Hongsheng, Yan. (2017). Experimental investigation on electrostatic monitoring technology for civil turbofan engine. Journal of Vibroengineering. 19. 967-987. 10.21595/jve.2016.17273. (Year: 2017).*

(Continued)

*Primary Examiner* — Stephanie E Bloss
(74) *Attorney, Agent, or Firm* — Dority & Manning, P.A.

(57) ABSTRACT

Methods and systems for identifying rub events of a gas turbine engine are provided. In one exemplary aspect, one or more power level changes of the turbine engine are identified from engine operating data. For a particular identified power level change, a magnitude of the power level change and a rate of the power level change are calculated. The calculated magnitude and rate of the given power level change define a data point that is plotted on a chart of the magnitude versus the rate of power level change. The data points are filtered based on one or more operating parameters, such as flight phase, to obtain a severity threshold specific to the operating conditions of the engine/aircraft at the time the power level change was performed. One or more data points are then compared to the severity threshold to identify possible rub events.

20 Claims, 14 Drawing Sheets

(51) Int. Cl.
*F01D 5/12* (2006.01)
*F01D 9/04* (2006.01)
*F01D 11/14* (2006.01)

(52) U.S. Cl.
CPC .... *F05D 2220/323* (2013.01); *F05D 2260/80* (2013.01); *G01M 15/14* (2013.01); *Y02T 50/671* (2013.01)

(56) References Cited

U.S. PATENT DOCUMENTS

| | | | |
|---|---|---|---|
| 4,856,272 | A | 8/1989 | Putman et al. |
| 7,431,557 | B2 | 10/2008 | Herron et al. |
| 7,455,495 | B2 | 11/2008 | Leogrande et al. |
| 7,465,145 | B2 | 12/2008 | Kane |
| 7,652,489 | B2 | 1/2010 | Dasgupta et al. |
| 7,819,625 | B2 | 10/2010 | Merrill et al. |
| 7,916,311 | B2 | 3/2011 | Corn et al. |
| 8,177,474 | B2 * | 5/2012 | Andarawis ............... F01D 9/00 324/662 |
| 8,682,563 | B2 | 3/2014 | Malcolmson et al. |
| 8,776,530 | B2 | 7/2014 | Shirooni et al. |
| 8,996,277 | B2 | 3/2015 | Beercroft et al. |
| 9,063,030 | B2 | 6/2015 | Slemp |
| 9,097,133 | B2 | 8/2015 | Dong et al. |
| 9,322,280 | B2 | 4/2016 | Funk et al. |
| 9,395,270 | B2 * | 7/2016 | Czerniak ............ G01M 13/028 |
| 2009/0003991 | A1 * | 1/2009 | Andarawis ............... F01D 9/00 415/118 |
| 2014/0230555 | A1 * | 8/2014 | Cerny .................. F01D 11/20 73/593 |
| 2014/0321985 | A1 | 10/2014 | Lewis |
| 2015/0378364 | A1 | 12/2015 | Karpman et al. |
| 2016/0018961 | A1 * | 1/2016 | Williams ............ G05B 23/024 715/772 |
| 2016/0047269 | A1 | 2/2016 | Zacchera et al. |
| 2017/0138212 | A1 * | 5/2017 | Morrill .................. F01D 11/20 |
| 2017/0234233 | A1 * | 8/2017 | Schwarz ................ F02C 7/268 60/204 |
| 2017/0234238 | A1 * | 8/2017 | Schwarz ................ F02C 7/268 60/778 |
| 2017/0292399 | A1 * | 10/2017 | Philbrick ............. F01D 17/145 |
| 2017/0370244 | A1 * | 12/2017 | Britt ....................... F02C 7/232 |

OTHER PUBLICATIONS

Melcher, et al., Toward a Fast-Response Active Turbine Tip Clearance Control, National Aeronautics and Space Administration, NASA/TM-2003-212627/REV1, Mar. 2004, 15 pages.

Kypuros, et al., A Reduced Model for Prediction of Thermal and Rotational Effects on Turbine Tip Clearance, Aeronautics and Space Administration, NASA/TM-2003-212226, Mar. 2003, 32 pages.

Kypuros, et al., Improved Temperature Dynamic Model of Turbine Subcomponents for Facilitation of Generalized Tip Clearance Control, https://ntrs.nasa.gov/search.jsp?R=20040070814, NAG3-2857, Jan. 1, 2004, 13 Pages.

Machine Translated Chinese Office Action Corresponding to Application No. 201810209977 dated Jan. 19, 2020.

* cited by examiner

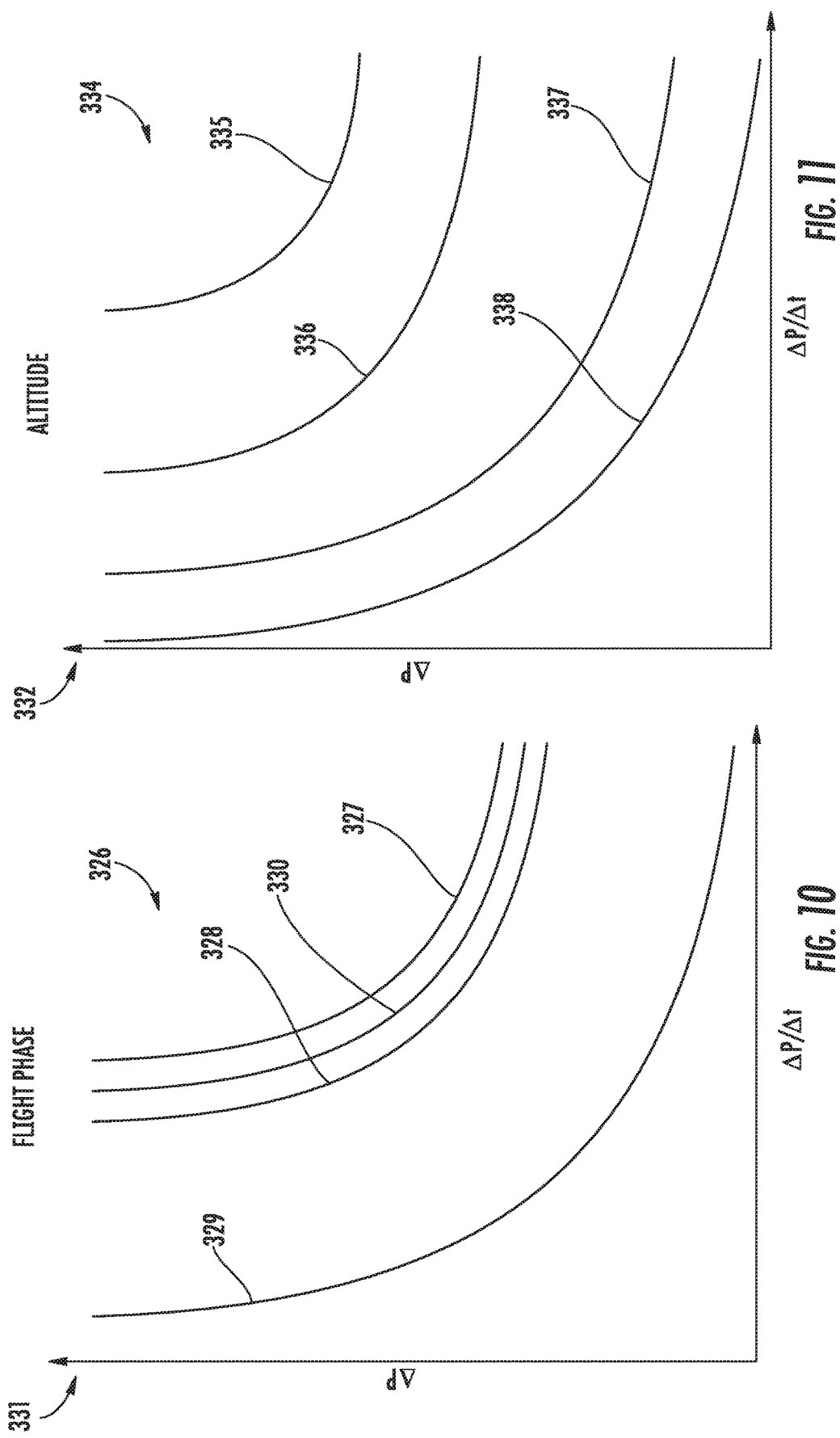

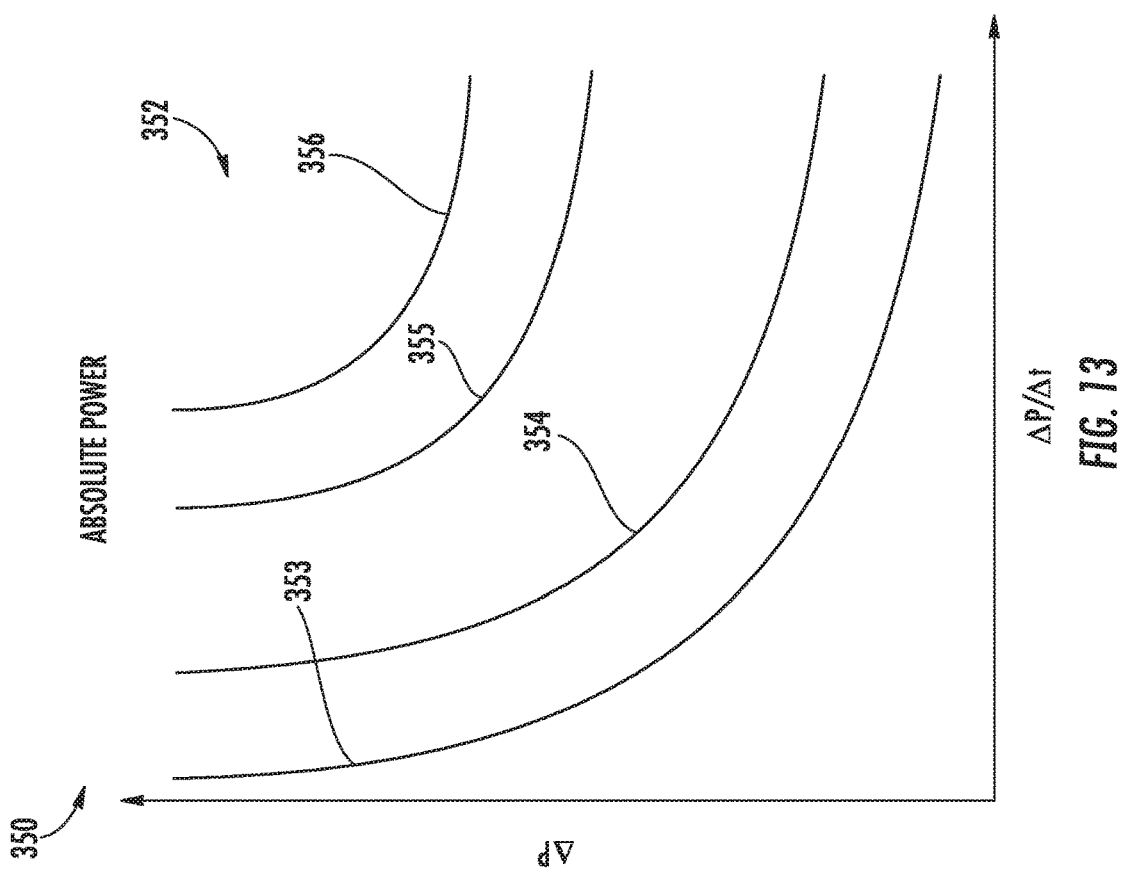
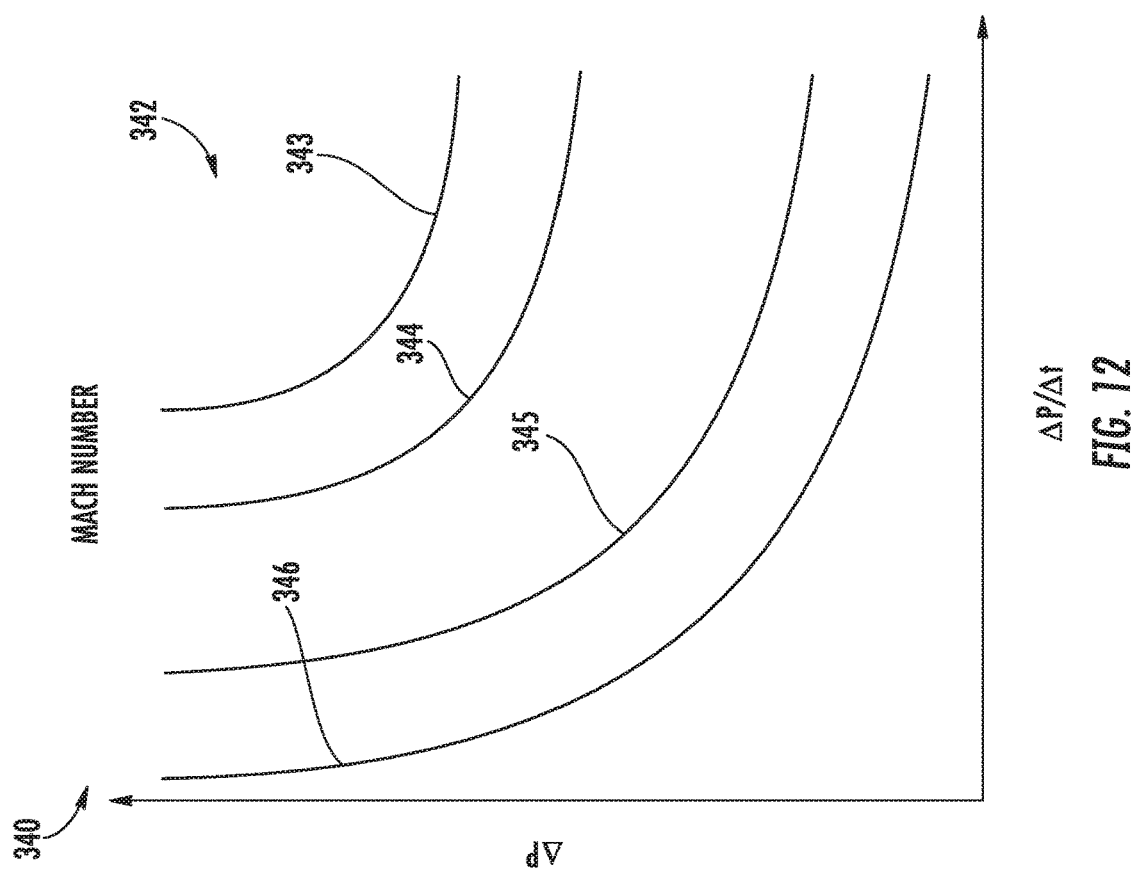

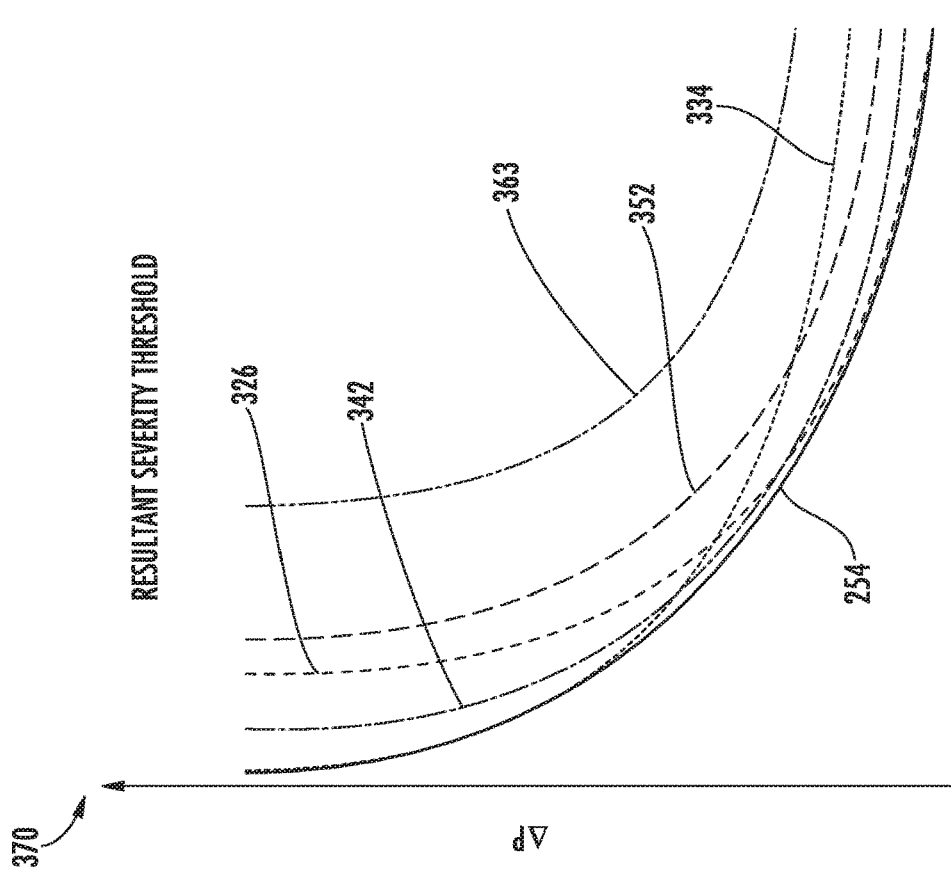
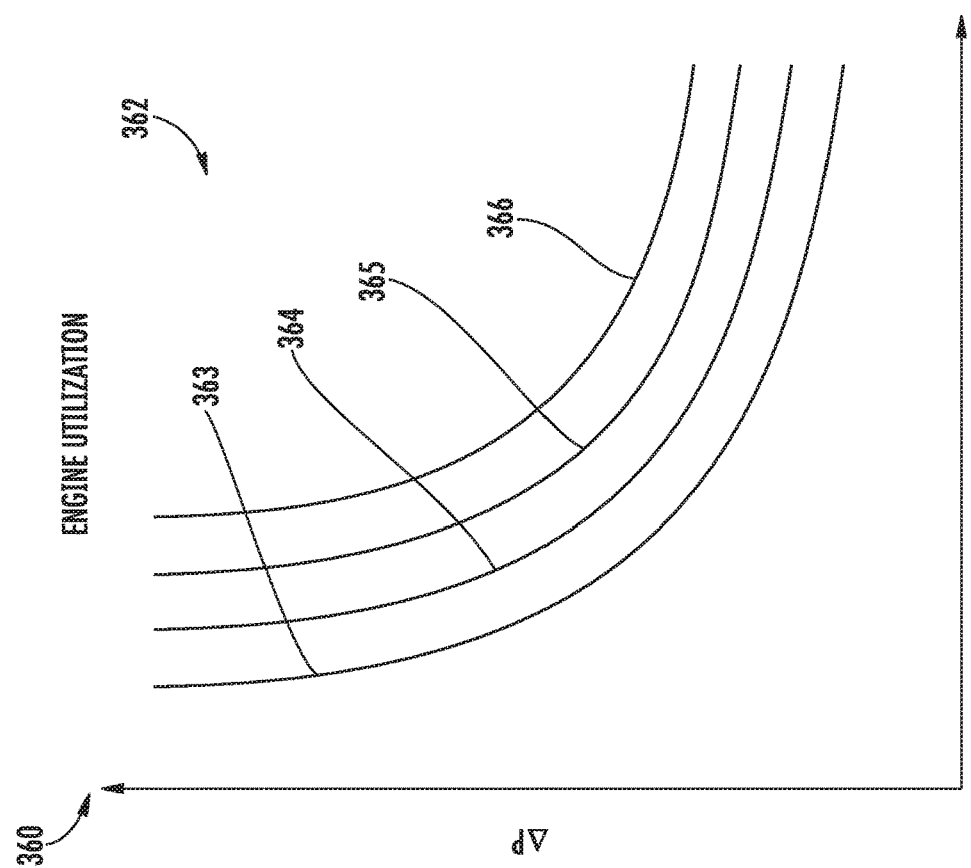

METHOD AND SYSTEM FOR IDENTIFYING RUB EVENTS

FIELD

The present subject matter relates generally to gas turbine engines. More particularly, the present subject matter relates to identifying rub events experienced by components of gas turbine engines during operation.

BACKGROUND

During operation, gas turbine engines of aircraft are controlled to extremely tight blade tip clearances, especially during cruise operations. In this way, better engine performance and efficiency can be achieved. Despite the benefits of tight clearances, the turbomachinery of the engine may be more vulnerable to rub events in a tight clearance configuration as thermal and mechanical loads expand and contract the engine components during transient operation. Rub events occur when a rotating turbomachinery component contacts or rubs against another object, such as when a turbine rotor blade tip contacts a shroud. Rub events can lead to blade tip loss, shroud damage, and seal deterioration, which decrease engine performance and efficiency.

Conventionally, rub events have been identified with sophisticated models, with manual inspections, with sensor systems, or a combination thereof. These conventional methods can be computationally or labor intensive and can add additional weight to the engine. Moreover, these conventional methods can be generally unreliable and expensive to implement. In addition, not all engines include sensor systems or models capable of identifying rub events.

Therefore, an improved method and system for identifying rub events would be desirable. In particular, a method and system that identifies rub events without need for computationally intensive models or adding additional weight to an engine or aircraft would be beneficial.

BRIEF DESCRIPTION

Exemplary aspects of the present disclosure are directed to methods and systems for identify rub events of gas turbine engines. Aspects and advantages of the invention will be set forth in part in the following description, or may be obvious from the description, or may be learned through practice of the invention.

In one exemplary aspect, the present disclosure is directed to a method for identifying a rub event of a turbine engine. The method includes comparing one or more data points to a severity threshold, each data point indicative of a magnitude and a rate of a power level change performed by the turbine engine during operation.

In some various embodiments, during comparing, if a particular data point is below the severity threshold, the data point is screened out as a non-rub event, and if the particular data point is beyond the severity threshold, the data point is identified as a possible rub event.

In some various embodiments, the method may further include determining whether the one or more data points identified as possible rub events are actual rub events. The method may also further include updating the severity threshold based at least in part on the data points determined to be actual rub events.

In other various embodiments, during comparing, if a particular data point is below the severity threshold and not within about a predetermined margin of the severity threshold, the data point is screened out as a non-rub event.

In other various embodiments, the method may further include filtering the one or more data points based at least in part on one or more operating parameters indicative of the conditions of the turbine engine during the power level change associated with a particular data point to determine a specific severity threshold that corresponds to the operating parameter, wherein when the particular data point is compared to the severity threshold, the specific severity threshold is used as the severity threshold.

In yet other various embodiments, the one or more operating parameters include at least one of: a dwell time prior to performing the power level change, an altitude, a Mach number, an absolute power level, a flight phase, an aircraft attitude or a rate of change in the aircraft attitude, and an engine utilization.

In yet other various embodiments, during filtering, the one or more data points are filtered based at least in part on two or more operating parameters of the turbine engine indicative of the conditions of the turbine engine during the power level change associated with a particular data point, each operating parameter having a corresponding specific severity threshold. The method may further include: calculating a resultant severity threshold based at least in part on the specific severity thresholds that correspond to their respective operating parameters, wherein when the particular data point is compared to the severity threshold, the resultant severity threshold is used as the severity threshold.

In some various embodiments, the method further includes determining whether the one or more data points are within one or more predetermined operating parameters. Moreover, the method further includes screening out the data points as a non-rub events if a particular data point is not within the one or more predetermined operating parameters.

In some various embodiments, one of the predetermined operating parameters is a dwell time range, wherein the dwell time range is indicative of a predetermined range of times in which the gas turbine engine dwells at a low power level prior to the power level change.

In some various embodiments, the method may further include screening out the one or more data points as a non-rub events in which the magnitude of the power level change is below a predetermined magnitude threshold. The method may also include screening out the one or more data points as non-rub events in which the rate of the power level change is below a predetermined rate threshold.

In some various embodiments, the method may further include obtaining engine operating data indicative of the power level change performed by the turbine engine during operation. The method may also include identifying the power level change of the turbine engine.

In some various embodiments, the method may further include calculating the magnitude and the rate of the power level change.

In some other various embodiments, the engine operating data is further indicative of one or more minimum clearance data points, the minimum clearance data points indicative of one or more known maneuvers or sequences where minimum clearance is anticipated. The method may further include updating the severity threshold based at least in part on the one or more minimum clearance data points.

In some other various embodiments, the method may further include plotting the data points on a chart, wherein the chart comprises a magnitude of power change axis and a rate of power change axis, wherein the severity threshold is substantially an asymptotic function plotted along the chart, and wherein as the asymptotic function increases along the rate of power change axis, the asymptotic function approaches a magnitude asymptote, and wherein as the asymptotic function increases along the magnitude of power change axis, the asymptotic function approaches a rate asymptote.

In some various embodiments, when the data point is beyond a critical severity threshold, the method may further include sending, in real time, a critical rub event signal.

In some various embodiments, the critical severity threshold is set beyond the severity threshold by about a ten percent margin (10%) or more.

In another exemplary aspect, the present disclosure is directed to a method for identifying a rub event of a turbine engine. The method includes filtering one or more data points based at least in part on one or more operating parameters to determine a specific severity threshold that corresponds to the operating parameter, each data point indicative of a magnitude and a rate of a power level change performed by the turbine engine during operation and the one or more operating parameters indicative of the conditions of the turbine engine during the power level change associated with a particular data point. The method also includes comparing one or more data points to a severity threshold, wherein when the data points are compared to the severity threshold, a resultant severity threshold is used as the severity threshold, wherein the resultant severity threshold is based at least in part on one or more of the specific severity thresholds that correspond to their respective operating parameters. The method additionally includes determining whether the one or more data points are within one or more predetermined operating parameters. The method further includes screening out the data points as non-rub events if the data points are not within the one or more predetermined operating parameters; wherein the data points beyond the severity threshold and not screened out as non-rub events are identified as rub events.

In some various embodiments, the operating parameters include at least one of an altitude, a Mach number, and a flight phase.

In some various embodiments, one of the predetermined operating parameters is a dwell time range, wherein the dwell time range is indicative of a predetermined range of times in which the gas turbine engine dwells at a low power level prior to the power level change.

In a further exemplary aspect, the present disclosure is directed to a system for identifying a rub event of a turbine engine. The system includes one or more computing devices that include one or more processors and one or more memory devices, the one or more memory devices storing instructions that when executed by the one or more processors cause the one or more processors to perform operations, the operations include: comparing one or more data points to a severity threshold, each data point indicative of a magnitude and a rate of a power level change performed by the turbine engine during operation, wherein the data points beyond the severity threshold are identified as possible rub events.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 10 provides a chart depicting severity thresholds for various phases of flight according to exemplary embodiments of the present subject matter;

FIG. 11 provides a chart depicting severity thresholds for various altitudes according to exemplary embodiments of the present subject matter;

FIG. 12 provides a chart depicting severity thresholds for various Mach numbers according to exemplary embodiments of the present subject matter;

FIG. 13 provides a chart depicting severity thresholds for various absolute power levels according to exemplary embodiments of the present subject matter;

FIG. 14 provides a chart depicting severity thresholds for various engine utilizations according to exemplary embodiments of the present subject matter;

FIG. 15 provides a chart depicting a resultant severity threshold according to exemplary embodiments of the present subject matter;

DETAILED DESCRIPTION

Figure 1:
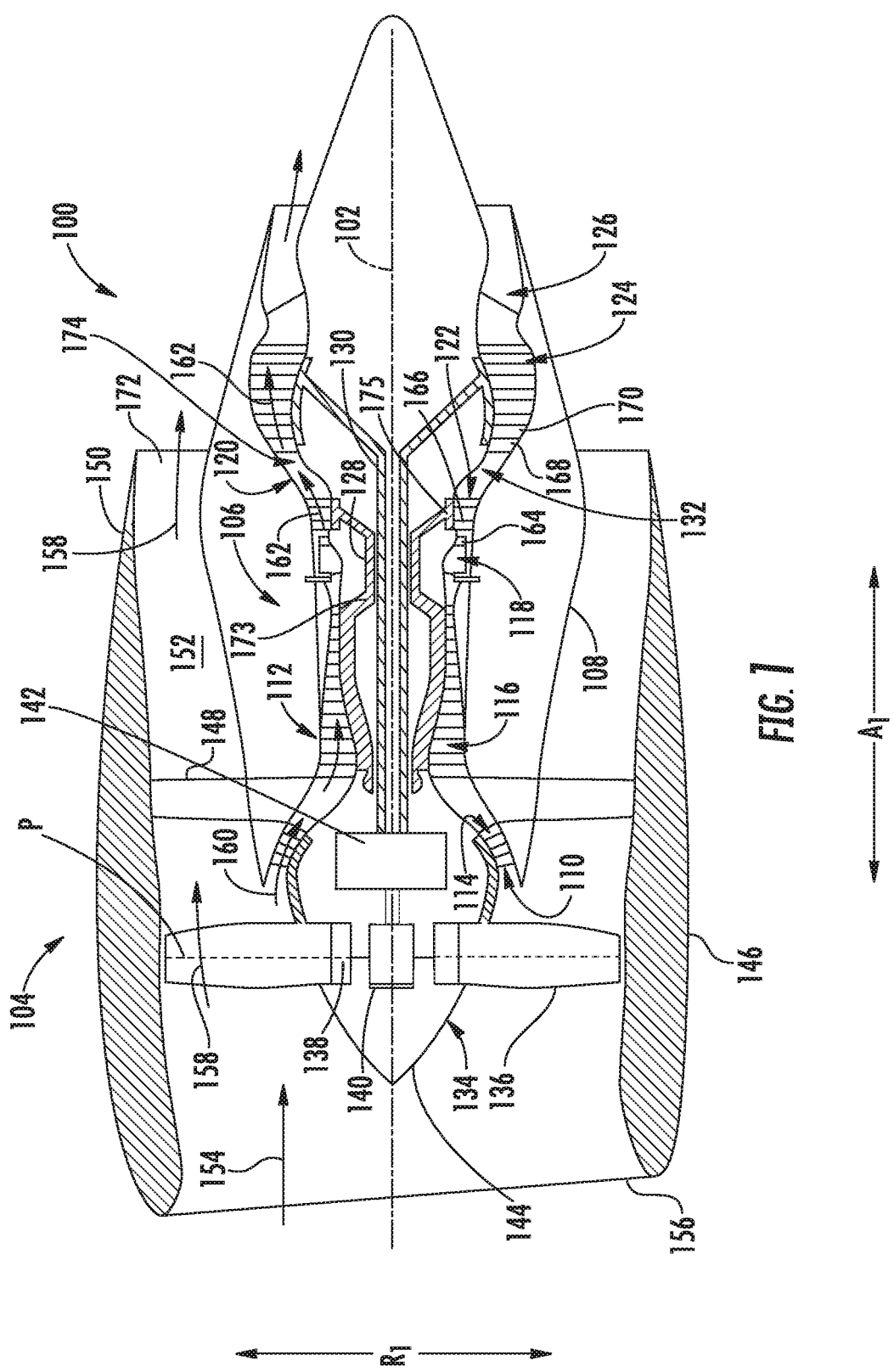
FIG. 1 is a schematic, cross-sectional view of an exemplary gas turbine engine according to exemplary embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows. "HP" denotes high pressure and "LP" denotes low pressure.

Further, as used herein, the terms "axial" or "axially" refer to a dimension along a longitudinal axis of an engine. The term "forward" used in conjunction with "axial" or "axially" refers to a direction toward the engine inlet, or a component being relatively closer to the engine inlet as compared to another component. The term "rear" used in conjunction with "axial" or "axially" refers to a direction toward the engine nozzle, or a component being relatively closer to the engine nozzle as compared to another component. The terms "radial" or "radially" refer to a dimension extending between a center longitudinal axis (or centerline) of the engine and an outer engine circumference. Radially inward is toward the longitudinal axis and radially outward is away from the longitudinal axis.

The present disclosure provides a method and system for identifying rub events of a gas turbine engine. In one exemplary aspect, one or more power level changes of the turbine engine are identified from engine operating data. For a particular identified power level change, a magnitude of the power level change and a rate of the power level change are calculated. The calculated magnitude and rate of the given power level change define a data point that is plotted on a chart of the magnitude versus the rate of power level change. The data points are filtered based on one or more operating parameters, such as flight phase, to obtain a severity threshold specific to the operating conditions of the engine/aircraft at the time the power level change was performed. Next, one or more data points are compared to the severity threshold to identify possible rub events. If the data point is beyond the severity threshold, the data point is identified as a possible rub event, and conversely, if the data point falls below the severity threshold, the data point is identified as a non-rub event. The data points that correspond to possible rub events can then be further screened based on one or more operating parameters of the turbine engine, such as dwell time at low power prior to a power level increase, to screen out data points that are unlikely to be actual rub events, even though the data points are beyond the severity threshold. After screening, operators can be alerted as to the possible rub events so that further action can be taken. One or more computing devices or engine controllers located on or off board of an aircraft, or both, can perform the exemplary methods described herein. It will be appreciated that the method and system described above are exemplary and that in some implementations, one or more parts of the method or components of the system can be omitted, modified, or rearranged.

The systems and methods described herein may provide a number of technical effects and benefits. For instance, for a particular power level change of a turbine engine, by comparing the magnitude and the rate of the power level change to a severity threshold, the computing systems need only calculate and compare a few parameters to identify a rub event, as opposed to using computationally intensive engine cycle models. Thus, the computing system can save valuable resources that can be used for other core functions. More particularly, by reducing or eliminating the need to use engine cycle models to identify rub events, the systems and methods can limit the allocation of processing and storage resources that are required for such identification. The saved resources can be allocated to other functions of the computing systems, such as the processing of other engine functions. In this way, the systems and methods according to exemplary aspects of the present subject matter have a technical effect of providing a computationally efficient approach to addressing identification of rub events.

The exemplary systems and methods of the present subject matter provide an improvement to aircraft computing technology. For instance, the methods and systems enable the aircraft technology to identify rub events without adding complex, expensive hardware, such as special purpose computers or sensor systems, as the systems and methods of the present disclosure may reduce or eliminate the need for computationally intensive engine cycle models or blade tip sensor systems. In conventional systems, for example, engine cycle models may include a combination of engine thermodynamic models, control system models, and clearance models to identify rub events. In some cases, to predict or identify a rub event using engine cycle models, greater than five hundred thousand (500,000) lines of code need be processed. In contrast, the present method and systems, in one exemplary aspect, may require less than two hundred (200) lines of code to identify a rub event. The present method and systems can compare one or more data points to a severity threshold to identify a possible rub event, where each data point is indicative of a magnitude and a rate of a given power level change. Thus, less processing power and less memory are required to make rub event identifications utilizing the methods and systems of the present subject matter. And consequently, additional or expensive computing devices and sensors are generally not needed. Moreover, the aircraft or engine computing systems can save computational resources that may otherwise be used for the coordination of other aircraft systems or engine functions. Accordingly, the saved processing and storage resources of the aircraft technology can be consumed for more critical, core functions of the aircraft.

Referring now to the drawings, FIG. 1 is a schematic cross-sectional view of a gas turbine engine 100 in accordance with an exemplary embodiment of the present disclosure. More particularly, for the embodiment of FIG. 1, the gas turbine engine 100 is an aeronautical, high-bypass turbofan jet engine configured to be mounted to an aircraft, such as in an under-wing configuration or tail-mounted configuration. As shown in FIG. 1, the gas turbine engine 100 defines an axial direction A1 (extending parallel to or coaxial with a longitudinal centerline 102 provided for reference), a radial direction R1, and a circumferential direction C1 (i.e., a direction extending about the axial direction A1; not depicted). In general, the gas turbine engine 100 includes a fan section 104 and a core turbine engine 106 disposed downstream from the fan section 104.

The exemplary core turbine engine 106 depicted generally includes a substantially tubular outer casing 108 that defines an annular inlet 110. The outer casing 108 encases, in serial flow relationship, a compressor section 112 including a first, booster or LP compressor 114 and a second, HP compressor 116; a combustion section 118; a turbine section 120 including a first, HP turbine 122 and a second, LP turbine 124; and a jet exhaust nozzle section 126. A HP shaft or spool 128 drivingly connects the HP turbine 122 to the HP compressor 116. ALP shaft or spool 130 drivingly connects the LP turbine 124 to the LP compressor 114. The compressor section, combustion section 118, turbine section, and jet exhaust nozzle section 126 together define a core air flowpath 132 through the core turbine engine 106.

Referring still the embodiment of FIG. 1, the fan section 104 includes a variable pitch fan 134 having a plurality of fan blades 136 coupled to a disk 138 in a spaced apart manner. As depicted, the fan blades 136 extend outwardly from disk 138 generally along the radial direction R1. Each fan blade 136 is rotatable relative to the disk 138 about a pitch axis P by virtue of the fan blades 136 being operatively coupled to a suitable actuation member 140 configured to collectively vary the pitch of the fan blades 136, e.g., in unison. The fan blades 136, disk 138, and actuation member 140 are together rotatable about the longitudinal centerline 102 by LP shaft 130 across a power gear box 142. The power gear box 142 includes a plurality of gears for stepping down the rotational speed of the LP shaft 130 to a more efficient rotational fan speed.

Referring still to the exemplary embodiment of FIG. 1, the disk 138 is covered by rotatable spinner 144 aerodynamically contoured to promote an airflow through the plurality of fan blades 136. Additionally, the exemplary fan section 104 includes an annular fan casing or outer nacelle 146 that circumferentially surrounds the fan 134 and/or at least a portion of the core turbine engine 106. Moreover, for the embodiment depicted, the nacelle 146 is supported relative to the core turbine engine 106 by a plurality of circumferentially-spaced outlet guide vanes 148. Further, a downstream section 150 of the nacelle 146 extends over an outer portion of the core turbine engine 106 so as to define a bypass airflow passage 152 therebetween.

During operation of the gas turbine engine 100, a volume of air 154 enters the gas turbine engine 100 through an associated inlet 156 of the nacelle 146 and/or fan section 104. As the volume of air 154 passes across the fan blades 136, a first portion of the air 154 as indicated by arrows 158 is directed or routed into the bypass airflow passage 152 and a second portion of the air 154 as indicated by arrow 160 is directed or routed into the LP compressor 114. The pressure of the second portion of air 160 is then increased as it is routed through the high pressure (HP) compressor 116 and into the combustion section 118.

Referring still to FIG. 1, the compressed second portion of air 160 from the compressor section mixes with fuel and is burned within the combustion section 118 to provide combustion gases 162. The combustion gases 162 are routed from the combustion section 118 along the hot gas path 174, through the HP turbine 122 where a portion of thermal and/or kinetic energy from the combustion gases 162 is extracted via sequential stages of HP turbine stator vanes 164 that are coupled to the outer casing 108 and HP turbine rotor blades 166 that are coupled to the HP shaft or spool 128, thus causing the HP shaft or spool 128 to rotate, thereby supporting operation of the HP compressor 116.

The combustion gases 162 are then routed through the LP turbine 124 where a second portion of thermal and kinetic energy is extracted from the combustion gases 162 via sequential stages of LP turbine stator vanes 168 that are coupled to the outer casing 108 and LP turbine rotor blades 170 that are coupled to the LP shaft or spool 130, thus causing the LP shaft or spool 130 to rotate, thereby supporting operation of the LP compressor 114 and/or rotation of the fan 134.

The combustion gases 162 are subsequently routed through the jet exhaust nozzle section 126 of the core turbine engine 106 to provide propulsive thrust. Simultaneously, the pressure of the first portion of air 158 is substantially increased as the first portion of air 158 is routed through the bypass airflow passage 152 before it is exhausted from a fan nozzle exhaust section 172 of the gas turbine engine 100, also providing propulsive thrust. The HP turbine 122, the LP turbine 124, and the jet exhaust nozzle section 126 at least partially define a hot gas path 174 for routing the combustion gases 162 through the core turbine engine 106.

As shown further in FIG. 1, a compressor discharge seal 173 is positioned after the last stage of the HP compressor 116 and the stationary combustion section 118. The compressor discharge seal 173 is employed to limit compressed air from leaking between the rotating compressor section 112 and the nonrotating combustion section 118. To optimize engine performance, tight clearance on this seal is highly desirable to minimize air leakage. Any air that leaks through the seal does not pass through the combustor of the gas turbine engine 100 and, therefore, does not contribute to the power produced by the combustion products.

In some exemplary embodiments, labyrinth-type seals can be employed as compressor discharge seals 173. A labyrinth-type seal comprises one or more circumferential teeth that are contiguous with a circumferential sealing surface wherein the teeth and sealing surface are relatively rotatable. Labyrinth seals can provide a high restriction to gas flow, and while there is some leakage, labyrinth seals do permit free rotation between upper and lower sections of the seal.

The effectiveness of labyrinth seals is a function of the clearance between the sealing teeth and the contiguous sealing surface. While engine parts can be accurately machined to obtain minimum clearance gaps and a highly effective seal, practical operation of the engine results in seal clearance degradation due to differential thermal growth between the sealing teeth and the sealing surface. Particularly, when the rotating components rub against the stationary components, rub events occur and excessive seal rubs may result in less than optimal engine performance.

Figure 2:
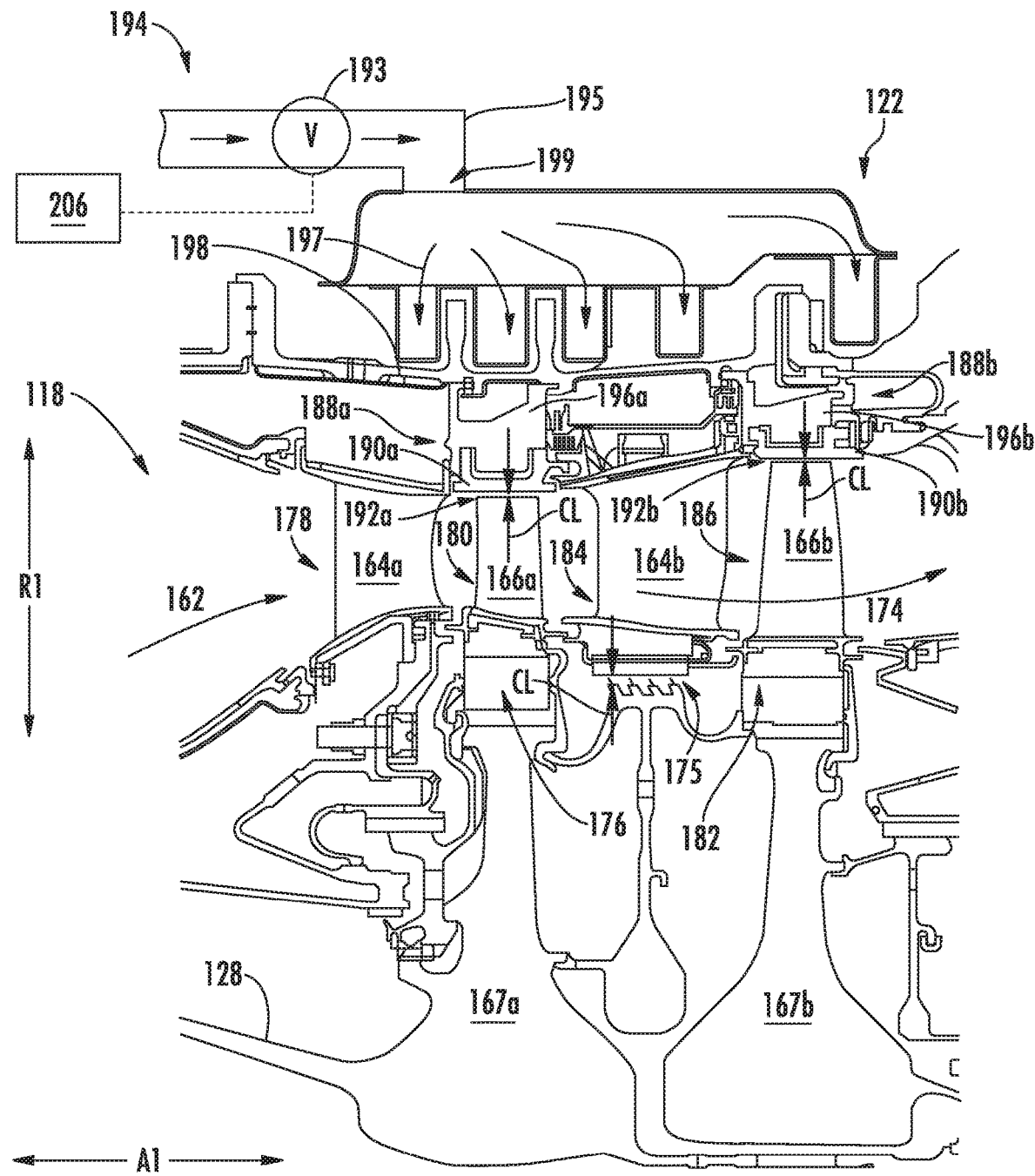
FIG. 2 is a close-up, cross sectional view of the rear end of the combustion section and the forward end of the HP turbine of the gas turbine engine shown in FIG. 1 according to exemplary embodiments of the present subject matter.

In addition, labyrinth seals can be used throughout the gas turbine engine 100. For example, interstage turbine seals 175 can be employed between the second stage nozzle 164b of the HP turbine 122 and the HP shaft or spool 128 (FIG. 2). The interstage turbine seals 175 may be employed to reduce fluid leakage between stages of the HP turbine 122 (or in other embodiments, the LP turbine 124, the LP compressor 114, and/or the HP compressor 116). Like the compressor discharge seal 173 as described above, the interstage turbine seals 175 include rotating and stationary components. The interstage seal system includes features to seal an interstage clearance gap CL (the clearance gap CL for the interstage turbine seal 175 is shown in FIG. 2). During operation of gas turbine engine 100, seal clearance degradation may result due to differential thermal growth between the sealing teeth and the sealing surface. Particularly, when the rotating components rub against the stationary components, rub events occur and excessive rubs may result in less than optimal engine performance, as noted above.

It will be appreciated that the exemplary gas turbine engine 100 depicted in FIG. 1 is by way of example only, and that in other exemplary embodiments, the gas turbine engine 100 may have any other suitable configuration. Additionally, or alternatively, aspects of the present disclosure may be utilized with any other suitable aeronautical gas turbine engine, such as a turboshaft engine, turboprop engine, turbojet engine, etc. Further, aspects of the present disclosure may further be utilized with any other land-based gas turbine engine, such as a power generation gas turbine engine, or any aeroderivative gas turbine engine, such as a nautical gas turbine engine.

FIG. 2 provides a close-up cross sectional view of the rear end of the combustion section 118 and the forward end of the HP turbine 122 of the gas turbine engine 100 as shown in FIG. 1 according to various embodiments of the present subject matter. As shown in FIG. 2, the HP turbine 122 includes, in serial flow relationship, a first stage 176 which includes an annular array 178 of stator vanes 164a (only one shown) axially spaced from an annular array 180 of turbine rotor blades 166a (only one shown). The HP turbine 122 further includes a second stage 182 which includes an annular array 184 of stator vanes 164b (only one shown) axially spaced from an annular array 186 of turbine rotor blades 166b (only one shown). The turbine rotor blades 166a, 166b extend radially outwardly from and are coupled to the HP shaft or spool 128 (FIG. 1) by rotor disks 167a, 167b. As shown in FIG. 2, the stator vanes 164a, 164b and the turbine rotor blades 166a, 166b rout combustion gases 162 from the combustion section 118 through the HP turbine 122 along the hot gas path 174.

As further shown in FIG. 2, the HP turbine 122 may include one or more shroud assemblies each forming an annular ring about an annular array of rotor blades 166. For example, a shroud assembly 188a may form an annular ring around the annular array 180 of rotor blades 166a of the first stage 176, and a shroud assembly 188b may form an annular ring around the annular array 186 of turbine rotor blades 166b of the second stage 182. Shrouds 190a, 190b are coupled with hangers 196a, 196b, which are in turn coupled with a turbine casing 198. In general, shrouds 190a, 190b of the shroud assemblies 188a, 188b are radially spaced from blade tips 192a, 192b of each of the rotor blades 166a, 166b. The shrouds 190a, 190b generally reduce clearance and leakage across the blade tips in order to maximize turbine power extracted from the hot gas path 174 via the blades 166a, 166b. A blade tip clearance gap CL is defined between the blade tips 192a, 192b and the shrouds 190a, 190b. It should be noted that the clearance gaps CL between shrouds and blade tips may exist in a similar manner in the LP compressor 114, HP compressor 116, and/or LP turbine 124. Moreover, it will be appreciated that clearance gaps between rotating seals and stationary elements, such as e.g., interstage seals, compressor discharge seals, etc., will likewise exist in a similar manner as described with respect to the HP turbine 122. Accordingly, the present subject matter disclosed herein is not limited to detecting rub events in HP turbines 122, and rather may be utilized to identify rub events in any suitable section of exemplary gas turbine engine 100.

It will be appreciated that engine performance parameters (e.g., thrust, specific fuel consumption (SFC), exhaust gas temperature (EGT), emissions, etc.) are dependent at least in part on the clearance gaps CL between turbine blade tips 192a, 192b and the shrouds 190a, 190b of the assemblies 188a, 188b. The clearance gaps CL between the turbine blade tips 192a, 192b and shrouds 190a, 190b are generally minimized to facilitate optimal engine performance and efficiency. A challenge in minimizing the clearance gaps CL is that mechanical and thermal loads acting on the turbomachinery components during operation of the engine expand and contract the components at different rates. For example, the rotor and casings surrounding the blades contract and expand at different rates. When the clearance gaps CL between the turbine blades 166a, 166b and the shrouds 190a, 190b are at a minimum, this phenomenon is commonly referred to as a "pinch point" or "pinch points."

On occasion, the turbomachinery components come into contact with or rub one another, causing a rub event. For example, a rub event occurs where a blade tip 192a, 192b comes into contact with or touches a corresponding shroud 190a, 190b. Rub events can occur in any number of situations and/or phases of flight, including during takeoffs, transient operations generally, power level changes during cruise operations, such as step climbs, re-accelerations generally, and/or during re-burst events and evasive maneuvers in the case of military applications. Rub events might also occur after a certain period of time after an in-flight shutdown and re-acceleration of the engine (i.e., a stopcock). Generally, rub events may lead to poor engine performance and efficiency, may reduce the effective service lives of the blades 166a, 166b and/or the shrouds 190a, 190b, and may deteriorate the exhaust gas temperature margin of the engine and the amount of time it can continue operate before refurbishment.

An active clearance control (ACC) system is one known system that controls and optimizes clearance gaps CL throughout the various phases of flight. As will be appreciated, the ACC system 194 modulates a flow of relatively cool or hot air from the engine fan section 104 and/or compressor section 112 (FIG. 1) and disperses the air on HP and/or LP turbine casings and shrouds to shrink or expand the engine casings relative to the turbine blade tips depending on the operation and flight conditions of the aircraft, among other factors. In this manner, the clearance gaps CL are adjusted to optimize engine performance.

As shown in FIG. 2, an ACC system 194 includes a controller 206 for controlling the amount and temperature of the air impinged on the HP and/or LP turbine casings to ultimately control the clearance gaps CL between the shrouds 190a, 190b and the blade tips 192a, 192b. Controller 206 can be a Full Authority Digital Engine Controller (FADEC) or an ACC application specific controller, for example. The ACC system 194 also includes an air supply duct 195 that receives air from a source, such as the air from the fan section 104 and/or discharge air from the compressor section 112, and routes the air shown by arrows 197 through a heat exchanger (not shown) and then through an inlet 199 of the turbine casing 198. A control valve 193 is in operative communication with the controller 206 and is positioned along the air supply duct 195 to selectively allow air 197 to flow to the turbine casings 198 or other possible locations, such as to impingement rings (not shown) circumferentially enclosing the LP turbine 124. When the control valve 193 is open, the relatively cool or hot air 197 is dispersed over the turbine casing 198 and shroud assemblies 188a, 188b to adjust the clearance gaps CL. However, even with the use of the ACC system 194 or a like system, rub events may still occur.

Figure 3:
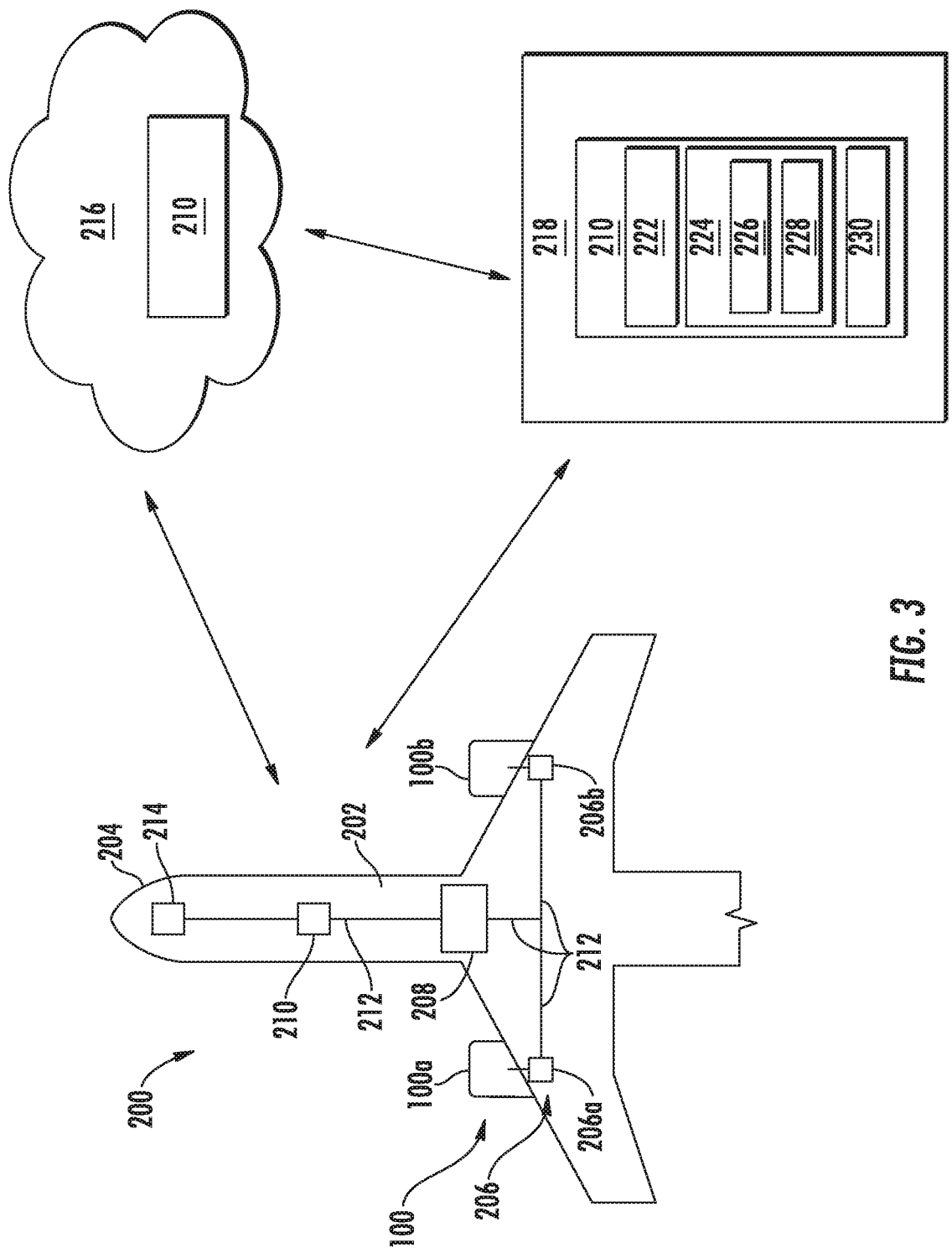
FIG. 3 provides a block diagram of a network according to exemplary embodiments of the present subject matter.

FIG. 3 provides a block diagram of a network according to exemplary embodiments of the present subject matter. As depicted, an exemplary aircraft 200 can be in operative communication with a cloud computing environment 216 and/or an off board system 218. Cloud computing environment 216 can be in operative communication with the aircraft 200 and/or the off board system 218. Likewise, the off board system 218 can be in operative communication with the aircraft 200 and/or the cloud computing environment 216. Various components of the aircraft 200, the cloud computing environment 216, and the off board system 218 will be discussed in turn.

Aircraft 200 includes one or more engines 100, such as the gas turbine engine 100 of FIG. 1, a fuselage 202, a cockpit 204, and one or more engine controllers 206 to control the one or more engines 100. Engine controllers 206 may be FADEC controllers, for example. Engine controllers 206 may also be commonly referred to as Electronic Engine Controllers (EEC) or Electronic Control Units (ECU). For this exemplary embodiment, the aircraft 200 includes two gas turbine engines 100a and 100b that are controlled by two engine controllers 206a and 206b, respectively. Engine controllers 206a, 206b can be used to optimize fuel management, engine performance, and to control the ACC system 194 of FIG. 2, for example. Moreover, engine controllers 206a, 206b can collect engine operating data indicative of one or more power level changes of the aircraft 200 over a predetermined time, such as over a full flight profile. Additionally, the engine operating data can be indicative of one or more operating parameters, such as altitude, Mach number, flight phase, etc. The aircraft 200, the cloud computing environment 216, the off board system 218, or a combination of the foregoing can utilize the engine operating data to carry out the methods described herein for identifying rub events.

Referring still to FIG. 3, the aircraft 200 can also include a communication network 208, such as an avionics network. Communication network 208 can include, for example, a local area network (LAN), a wide area network (WAN), SATCOM network, VHF network, a HF network, a Wi-Fi network, a WiMAX network, a gatelink network, and/or any other suitable communications network for transmitting messages to and/or from the aircraft 200, such as to the cloud computing environment 216 and/or the off board system 218. Such networking environments may use a wide variety of communication protocols. The communication network 208 can include a data bus or a combination of wired and/or wireless communication links. The communication network 208 can also be coupled to the one or more controllers 206a, 206b by one or more communication cables 212 or by wireless means. The one or more controllers 206a, 206b can be configured to communicate with one or more computing devices 210 of the aircraft 200 via the communication network 208.

As shown, aircraft 210, cloud computing environment 216, and off board system 218 can all include one or more computing devices 210. The computing devices 210 can be in operative communication with the communication network 208 of aircraft 210 and/or with one another. Each of the computing devices 210 can include various components for performing various operations and functions. Specifically, as depicted more clearly with respect to the computing devices 210 of the off board system 218, the computing devices 210 can each include one or more processors 222 and one or more memory devices 224. The one or more memory devices 224 can store instructions 226 that when executed by the one or more processors 222 cause the one or more processors 222 to perform the operations and functions, such as those described herein for identifying rub events.

The one or more processors 222 can include any suitable processing device, such as a microprocessor, microcontroller, integrated circuit, logic device, and/or other suitable processing device. The one or more memory devices 224 can include one or more computer-readable media, including, but not limited to, non-transitory computer-readable media, RAM, ROM, hard drives, flash drives, and/or other memory devices. The memory devices 224 can further store data 228 that can be accessed by the processors 222. For example, the data 228 can include data received from one or more aircraft sensors (not shown) or an input/output from an engine controller 206, such as engine speed or power over time, and/or any other data and/or information described herein. The instructions 226 can be software written in any suitable programming language or can be implemented in hardware. Additionally, and/or alternatively, the instructions 226 can be executed in logically and/or virtually separate threads on processor(s) 222.

The computing devices 210 can also include a network interface 230 used to communicate, for example, with the other components or nodes of the network or with off board system 218, cloud computing environment 216, or both. The network interface 230 can include any suitable components for interfacing with one or more networks, including for example, transmitters, receivers, ports, controllers, antennas, and/or other suitable components. One or more of the computing devices 210 of the cloud computing environment 216 and/or the off board system 218 can be configured to receive one or more commands or instructions 226 from the computing devices 210 of the aircraft 200 and/or send commands or instructions 226 thereto. The one or more computing devices 210 can be connected to one or more display devices 214, such as one or more display devices located in cockpit 204. The one or more display devices 214 can be configured to display information to a user, such as a pilot. It will be appreciated that the engine controllers 206 may include the same or similar components and function in the same or similar manner to the one or more computing devices 210 described herein.

Figure 4:
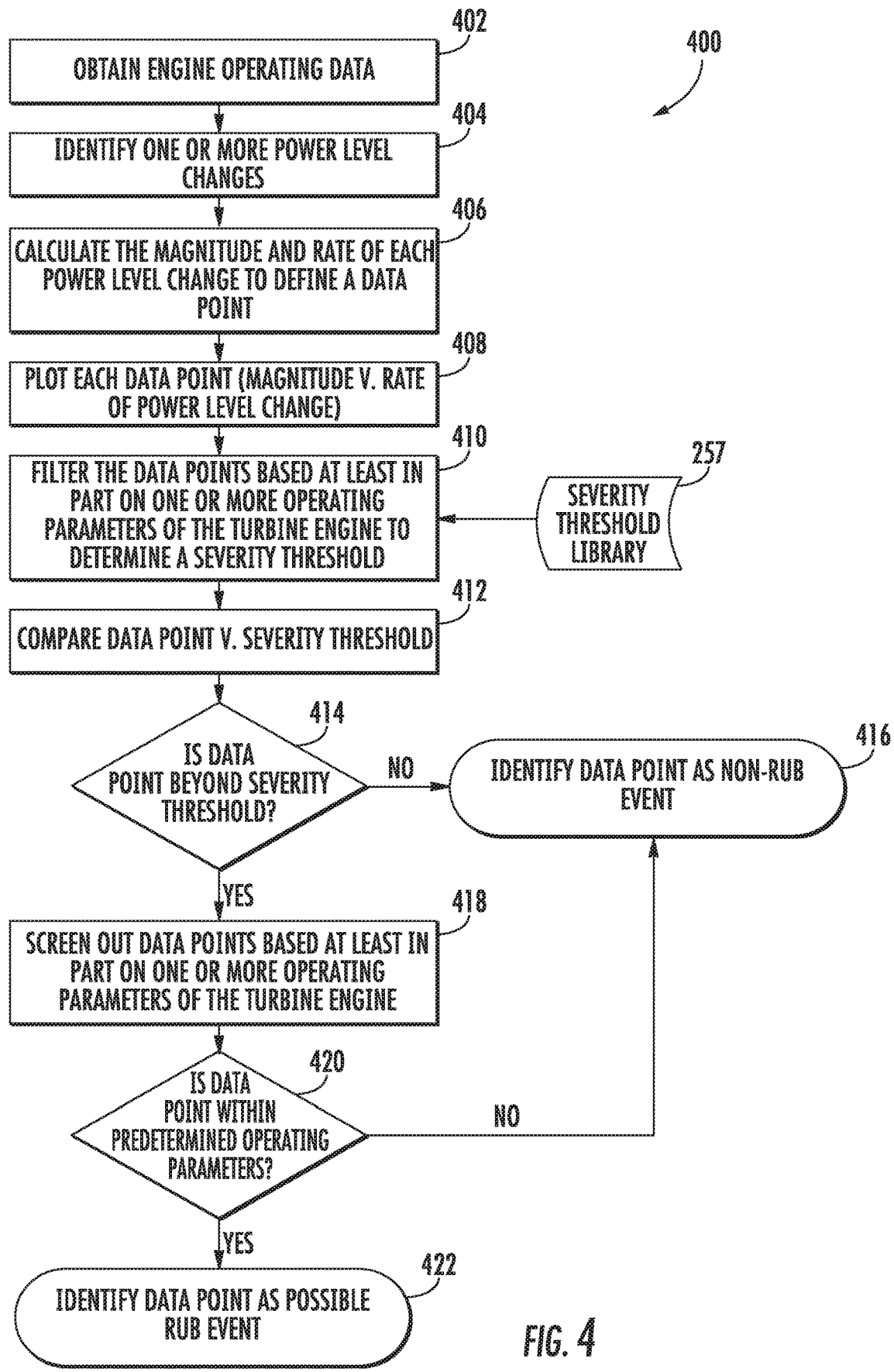
FIG. 4 depicts a flow diagram of an exemplary method for identifying rub events according to exemplary embodiments of the present subject matter.

FIG. 4 depicts a flow diagram of an exemplary method (400) for identifying a rub event. Some or all of the method (400) can be implemented by one or more computing device(s) 210 and/or engine controllers 206 shown in FIG. 3. Some or all of the method (400) can be performed onboard the aircraft 200 and while the aircraft 200 is in operation, such as when an aircraft 200 is in flight. Alternatively, some or all of the method (400) can be performed while the aircraft 200 is not in operation and/or off board of the aircraft 200. In addition, FIG. 4 depicts method (400) in a particular order for purposes of illustration and discussion. It will be appreciated that exemplary method (400) can be modified, adapted, expanded, rearranged and/or omitted in various ways without deviating from the scope of the present subject matter. General reference is made to FIG. 4 in describing exemplary method (400). Specific reference may be made to various figures to more fully explain a particular part thereof.

At (402), exemplary method (400) includes obtaining engine operating data. For this exemplary embodiment, engine operating data includes data indicative of one or more power level changes executed by gas turbine engine 100 during flight. Engine operating data may also include various operating parameters that can be either sensed or calculated, such as e.g., dwell time at low power prior to power level increases of the aircraft, Mach number, flight phase, aircraft attitude or rate of change in aircraft attitude, absolute level of power, engine utilization, measured performance deterioration of the engine components, etc. It will be appreciated that other engine operating parameters could be included.

At (404), exemplary method (400) includes identifying a power level change 240 of the turbine engine 100. This could be done onboard the aircraft during flight or off board when the aircraft is not in operation. A power level change 240 could be either an acceleration (i.e., an increase in engine power) or a deceleration (i.e., a decrease in engine power). A power level change 240 can be identified by processing engine operation data 242 with one or more computing devices 210. In particular, an algorithm can be used to identify each power level change 240 over a predetermined time, such as the entire flight profile or during a particular phase of flight, such as during cruise operation, for example. Other suitable methods can be used to identify power level changes as well.

Figure 5:
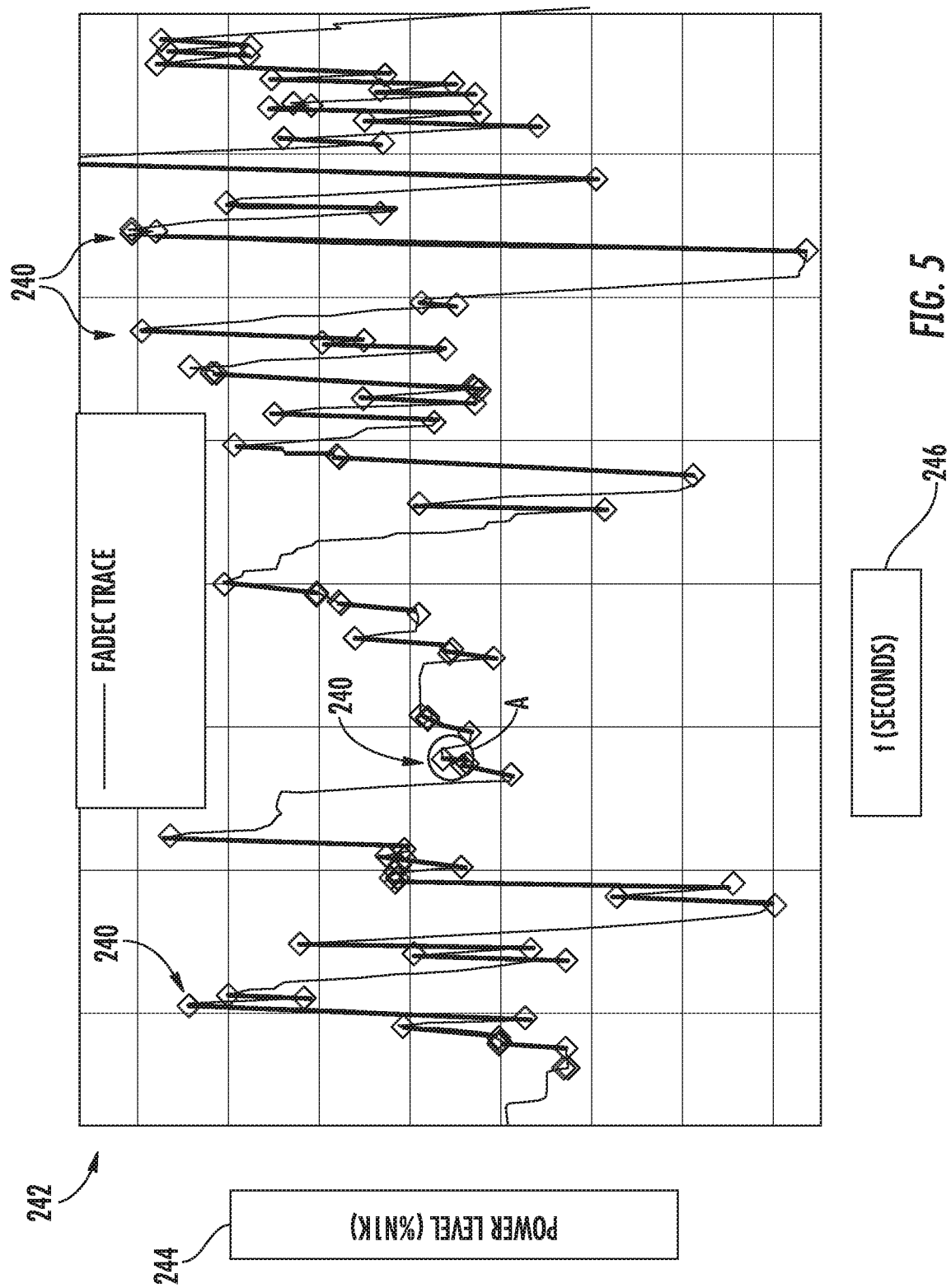
FIG. 5 provides exemplary engine operating data graphically depicting turbine engine power versus time and showing various power level changes of the turbine engine according to exemplary embodiments of the present subject matter.

FIG. 5 provides a graphical representation of exemplary engine operating data 242 depicting engine power 244 versus time 246. As shown, the gas turbine engine 100 made a number of power level changes 240 during operation. Engine power 244 is shown as a percentage of N1K, or the corrected rotational fan speed of fan 134. The actual fan speed N1 may be corrected to a corrected fan speed N1K to a standard day condition, such that the corrected fan speed N1K is equal to:

$$N1K = N1_{ACT} / \sqrt{T_{INLET} \div 518.67°Ra} \qquad \text{(Equation 1)}$$

where $N1_{ACT}$ is the actual fan speed and $T_{INLET}$ is the fan inlet temperature in Rankine. Although the engine power 244 is shown as a percentage of N1K, other engine components could be used to determine the engine power of gas turbine engine 100. For example, a calculated engine pressure ratio, combining the ratio of the one or more pressure measurements upstream of the core nozzle 126 and/or fan nozzle 172 and dividing by pressure to the engine inlet 156 determine the engine power. As another example, N2K, or the corrected rotational speed of the HP shaft or spool 128 could be used to determine the engine power 244. As another example, in a turboshaft engine with a torque meter installed on the power delivery shaft, the engine delivered power can be calculated directly from the product of torque and shaft rotational speed. In some exemplary embodiments, one, all, or a combination of the foregoing can be used to determine engine power. Time 246 can be measured in any suitable units for time, such as seconds as shown in FIG. 5.

For this exemplary embodiment, one or more FADEC engine controllers 206 of the aircraft 200 have identified various power level changes 240 of the gas turbine engine 100 (only some of which are labeled in FIG. 5). By way of example, as noted above, a power level change algorithm executable on a computing device 210 or engine controller 206 can identify each instance or occurrence of when the pilot or autopilot increased or decreased the power level of the gas turbine engine 100 of the aircraft 200. In FIG. 5, however, only the accelerations or accels of the gas turbine engine 100 have been identified by the power level change algorithm. The power level change algorithm can monitor for power level changes of a predetermined magnitude at predetermined intervals. A predetermined magnitude could be a power level change greater than a half percent of N1K (0.5% of N1K) and a predetermined interval could be every one hundredth of a second, for example.

Figure 6:
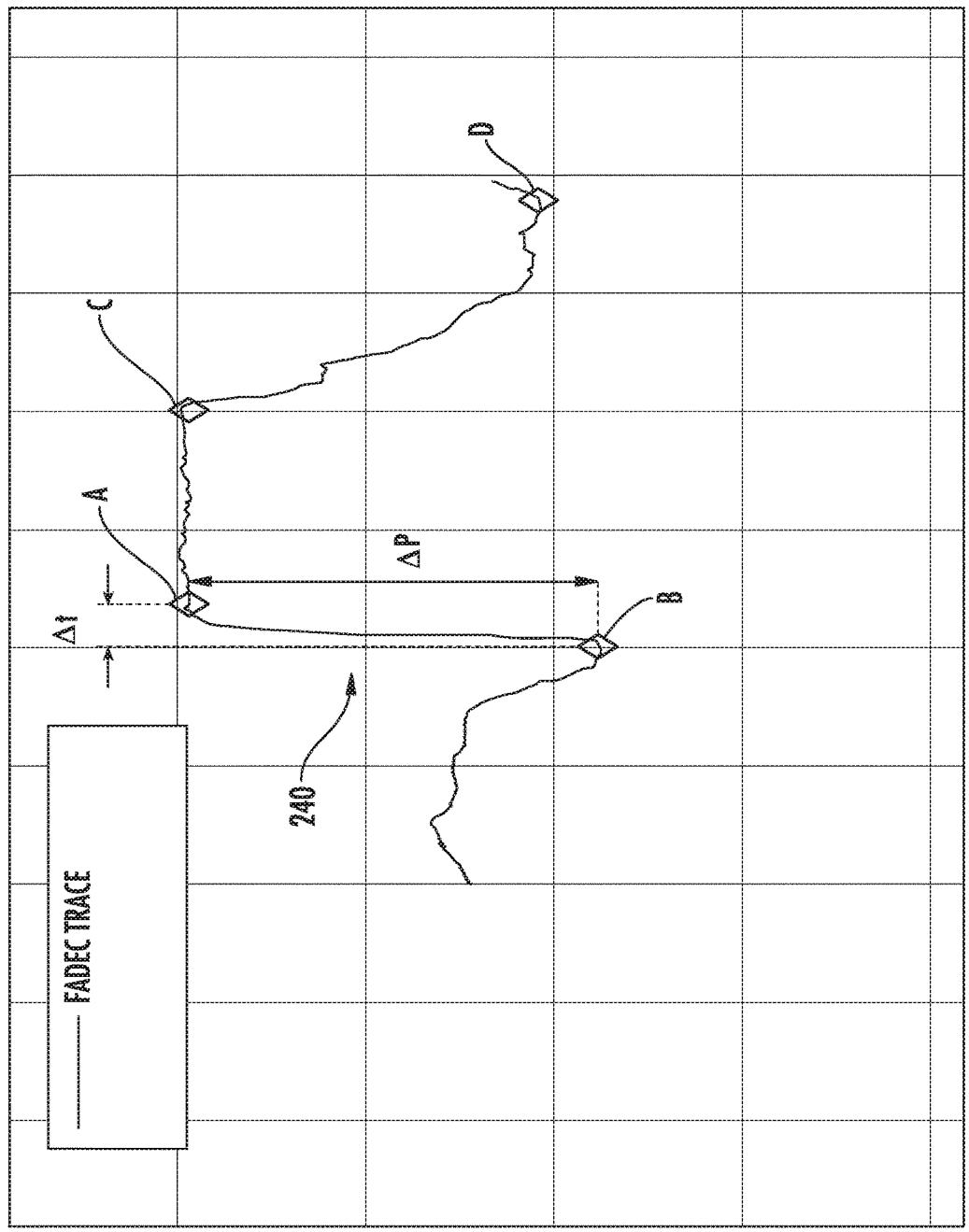
FIG. 6 provides a close-up view of Section A of FIG. 5 according to exemplary embodiments of the present subject matter.

Referring again to FIG. 4, at (406), once the power level changes 240 have been identified, a magnitude and a rate of each power level change 240 are calculated. With reference also to FIG. 6, a close-up view of Section A of FIG. 5 detailing an exemplary power level change 240 of gas turbine engine 100 during operation is provided. Specifically, in FIG. 6, power level change 240 is a power level increase of gas turbine engine 100.

By way of example, to calculate the magnitude of the power level change 240 of FIG. 6, or change in power ΔP, the percentage of N1K at Point B is subtracted from the percentage of N1K at Point A. The difference in the percentages at Point A and B is deemed the magnitude of the power level change 240.

To calculate the rate, the elapsed time between Point A and Point B is calculated to determine a change in time Δt. The rate of the power level change 240 is defined as ΔP/Δt.

For this exemplary embodiment, Point B is defined as a point where the power of the engine is at its lowest before the magnitude of the power is increased a predetermined magnitude. Point A is defined as a point where the magnitude of the power stabilizes or stops increasing within a predetermined range for a predetermined time. Ensuring that the magnitude is of a predetermined magnitude may improve processing times as the computing device 210 or engine controller 206 need not calculate power level changes akin to "noise", such as very small power fluctuations or sensor measurement variation. Moreover, ensuring that the power has stabilized within a predetermined range for a predetermined time may improve the consistency and accuracy of identification and calculation of each power level change.

In other exemplary embodiments, to determine the magnitude and rate of a power level decrease, as shown in FIG. 6, a Point C is defined as the first point where the power has decreased a predetermined amount and Point D is defined as a point where the magnitude of the power stabilizes or stops decreasing within a predetermined range for a predetermined time.

Once the magnitude and rate of a particular power level change are calculated, the magnitude and rate of the power level change 240 define a data point 252 for that particular power level change 240. Each power level change 240 has a corresponding data point 252.

Figure 7:
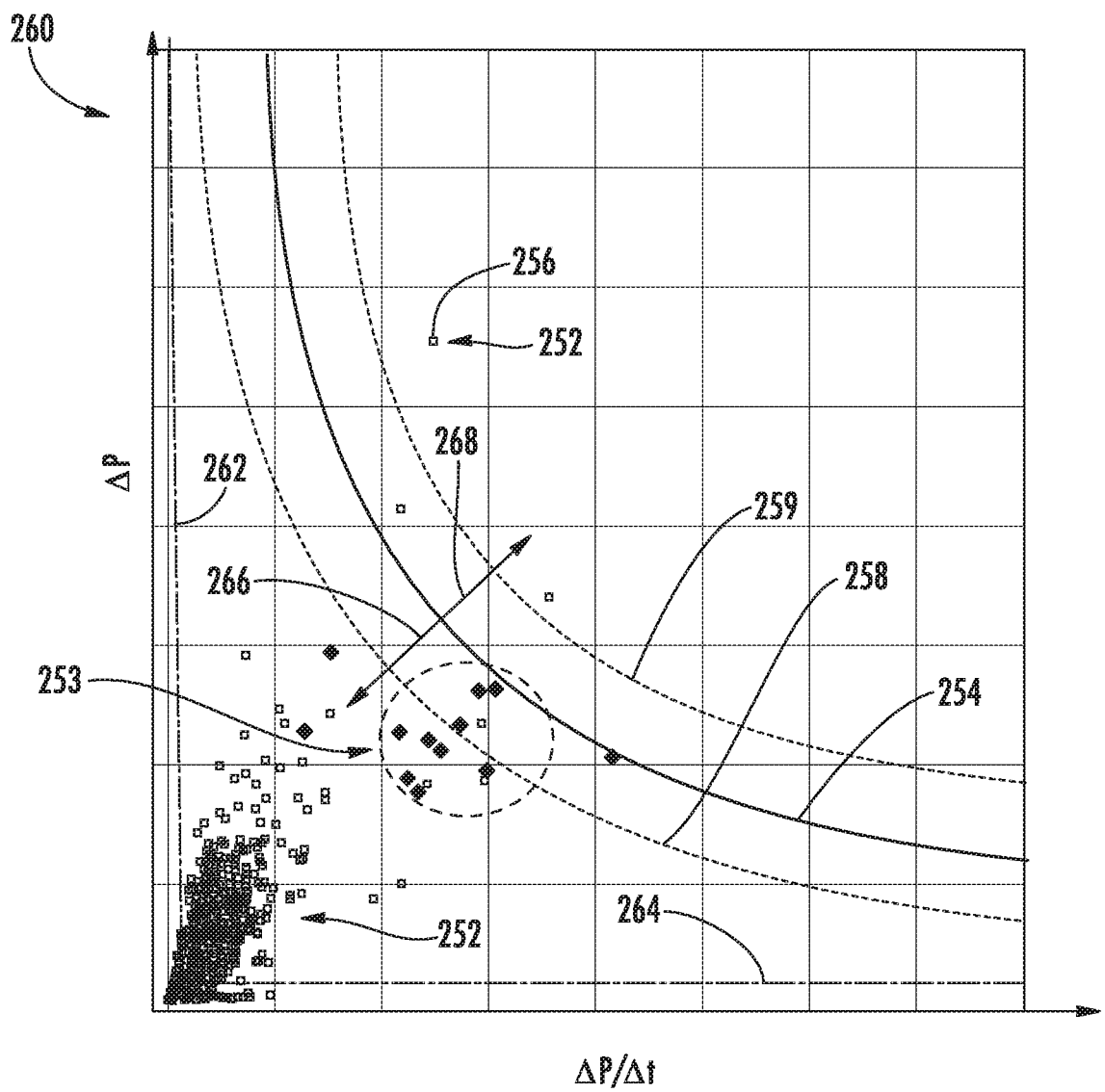
FIG. 7 provides an exemplary chart of a magnitude versus a rate of power change of an exemplary gas turbine engine according to exemplary embodiments of the present subject matter.

With reference generally to FIGS. 4 and 7, at (408), the data points 252 that correspond with the various power level changes 240 are plotted on a chart 260. FIG. 7 provides exemplary chart 260 with the magnitude of power change (ΔP) defining a vertical y-axis (i.e., magnitude of power change axis) and the rate of power change (ΔP/Δt) defining a horizontal x-axis (i.e., rate of power change axis). It will be appreciated that the magnitude of power change could be the horizontal x-axis and the rate of the power change could be the y-axis in other exemplary embodiments. For this embodiment, one or more data points 252 are determined by plotting the magnitude of the power level change against the rate of the power level change.

As depicted in FIG. 7, the chart 260 includes a severity threshold 254. In short, the severity threshold 254 is used to determine which data points 252 should be identified as possible rub events. In particular, if a data point is beyond the severity threshold 254, it may be deemed a possible rub event. And conversely, if a data point is below the severity threshold 254, it may be screened out as a non-rub event. How data points 252 are compared to the severity threshold 254 will be explained in greater detail with reference to (412) of method (400). An individual severity threshold may apply to a single clearance interface CL, such as the first stage 176 of the HP turbine 122, a multicomponent module such as the HP turbine 122, or the engine 100 as a whole.

The severity threshold 254 is shown in FIG. 7 having substantially an asymptotic shape. Specifically, the severity threshold 254 is a function defining a substantially asymptotic curve plotted along the chart 260 (i.e., where the magnitude of the power change versus the rate of the power change are the y- and x-axes, respectively). A vertical asymptote is defined generally at or proximate the y-axis (denoted herein as the rate asymptote 262) and a horizontal asymptote is defined generally at or proximate the x-axis (denoted herein as the magnitude asymptote 264). As the severity threshold 254 increases along the x-axis, the asymptotic curve approaches the magnitude asymptote 264, and as the severity threshold 254 increases along the y-axis, the asymptotic curve approaches the rate asymptote 262. The severity threshold 254 exhibits asymptotic behavior as the rate of the power level change increases at least in part because relatively small power changes can be accomplished relatively quickly with little risk of a rub event. Likewise, the severity threshold 254 exhibits asymptotic behavior as the magnitude of the power level change increases at least in part because relatively slow power changes can be very large in magnitude with little risk of a rub event.

For this exemplary embodiment, the severity threshold 254 is an adjustable threshold that may be modified throughout the service life of the gas turbine engine 100. Initially, the severity threshold 254 can be an asymptotic curve indicative of test cases for the specific engine, simulations of the particular engine model, actual engine operating data of like or similar engines, inspection of engine hardware, or a combination thereof, for example. As the engine is broken in, engine operating data from the flights can be used to better fit the severity threshold 254 to the specific engine. By way of example, the severity threshold 254 can be updated (i.e., adjusted or confirmed as accurate) based on fielded engine data where operating conditions and throttle sequence are predicted by analytical models to result in minimum clearances for the engine. Thus, these field data can assist in determining the curvature of the asymptotic function of the severity threshold. For instance, the severity threshold 254 can be set slightly beyond data points 252 associated with these minimum clearance conditions that have been confirmed as non-rub events by a lack of observed performance deterioration, and by manual inspections via borescope or during engine refurbishment. In this way, the severity threshold 254 does not include known non-rub events, but is approximately defined where rubs are expected (i.e., slightly beyond minimum clearance points 253; FIG. 7).

The severity threshold 254 can be adjusted or updated by way of a machine learning technique, for example. Specifically, a machine learning algorithm can be implemented on or by one or more computing devices 210 or engine controllers 206 to more accurately determine the optimal severity threshold 254 for a particular engine. The machine learning technique can be performed in the cloud computing environment 216, the off board system 218, the aircraft 210, and/or a combination of the foregoing.

An exemplary machine learning technique includes training data, a model trainer, and a severity threshold adjustment model. The training data can include data points from the specific engine in question, engine operating data of like or similar engines, fleet engine operating data, an aggregation of available engine operating data, the like, and/or a combination of the foregoing. The training data could include fielded data, as noted above. The model trainer can train the severity threshold model using the training data via a supervised, semi-supervised, or unsupervised technique. For instance, the training data may include some data points that are labeled as "rub event" or "non-rub event" and other data points may not be labeled.

The machine learning technique can implement the model trainer to train and/or re-train one or more severity threshold adjustment models. As examples, the model trainer can perform back propagation techniques such as batch gradient descent or stochastic gradient descent to train the models. The model trainer can also leverage dropout techniques to combat model over-fitting. Exemplary models include one or more of, e.g., Bayesian hybrid models, linear discriminant analysis models, a partial least squares discriminant analysis models, support vector machine models, random tree models, logistic regression models, naïve Bayes classification models, K-nearest neighbor classification models, quadratic discriminant analysis models, anomaly detection models, boosted and bagged decision tree models, artificial neural network models, C4.5 models or k-means models. It will be appreciated that other suitable machine learning models are also contemplated. The machine learning technique can use a parametric severity threshold adjustment model, a non-parametric severity threshold adjustment model, or both as will be appreciated from the list of exemplary models noted above. For instance, for parametric models such as logistic regression models, the form of the function (i.e., the severity threshold) can be selected as an asymptotic curve. Through use of the training data, the coefficients of the function can be learned and then applied to adjust the function to fit the particular engine. For non-parametric models, such as neural networks or support vector machine models, the form of the function of the severity threshold adjustment model need not be selected; rather the model would take form upon learning through use of training data.

The severity threshold adjustment model can be retrained at certain intervals or after certain confirmed rub events have occurred, for example. In this way, the severity threshold remains accurate throughout the service life of the gas turbine engine 100. For instance, as the turbomachinery components of gas turbine engine 100 deteriorate over time, the machine learning technique will account for this deterioration and will become less restrictive (i.e., it will allow for slightly greater combinations of power level change magnitudes and rates, as blades will be less likely to rub with blade tip loss). It will be appreciated that in other exemplary embodiments, that the severity threshold could remain static through the service life of the engine.

With reference again to FIG. 4, at (410), exemplary method (400) includes filtering the data points 252 based at least in part on one or more operating parameters of the gas turbine engine 100. Filtering the data points 252 may improve the accuracy in identifying rub events. Specifically, aside from the ability of severity threshold 254 to dynamically adjust by using machine learning or another suitable technique, by filtering the data points 252 at (410), a severity threshold 254 specific to the operating conditions of the aircraft/engine when the power level change was performed can be utilized to carry out method (400). Stated alternatively, the data points 252 can be filtered based at least in part on one or more operating parameters indicative of the conditions of the turbine engine 100 during the power level change associated with a particular data point to determine a specific severity threshold that corresponds to the operating parameter. One or more memory device(s) 224 of one or more of the computing device(s) 210 or engine controllers 206 can include a severity threshold library 257 for storing one or more severity thresholds 254 specific to one or more particular sensed, measured, calculated, or predicted operating parameters. These severity thresholds 254 can be retrieved from the memory device(s) 224 and utilized to execute method (400).

Figure 8:
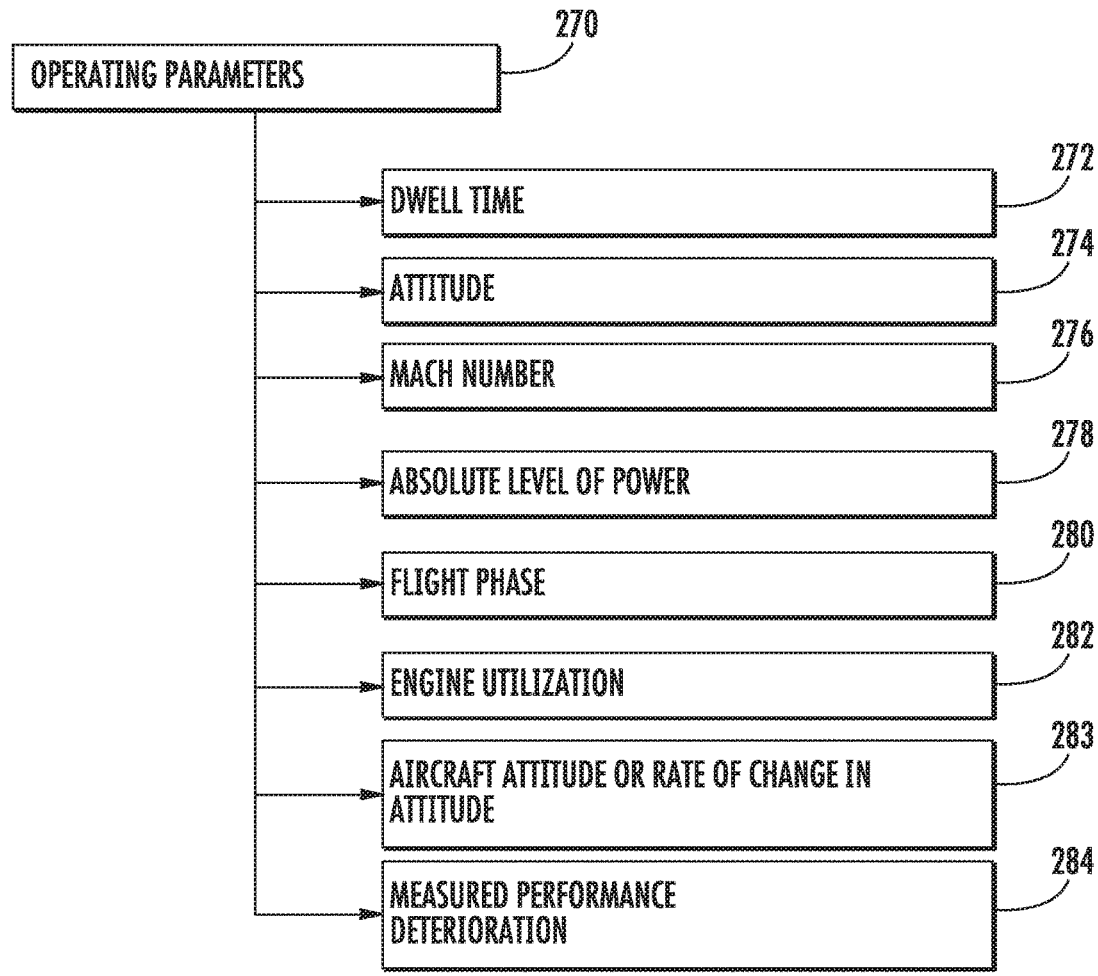
FIG. 8 provides a list of exemplary operating parameters according to exemplary embodiments of the present subject matter.

FIG. 8 provides a list of exemplary operating parameters 270. The one or more operating parameters may include: the dwell time 272 at low power prior to a given power level change 240, various flight conditions, such as altitude 274 and Mach number 276, the absolute power 278 of the aircraft 200 when a given power level change 240 is made, the flight phase 280 in which the power change was made, the engine utilization 282, the aircraft attitude or rate of change of aircraft attitude 283, the measured performance deterioration 284 of the engine, as well as other operational parameters not expressly listed. Various ways in which the data points 252 can be filtered based on one or more of the operating parameters 270 are discussed in turn.

The flight phase 280 can be used to filter the data points 252. Particularly, the data points 252 can be filtered by flight phase 280 such that the data points 252 are compared to a phase-specific severity threshold 254 that is specific to the phase of flight in which the power level change was made.

Figure 9:
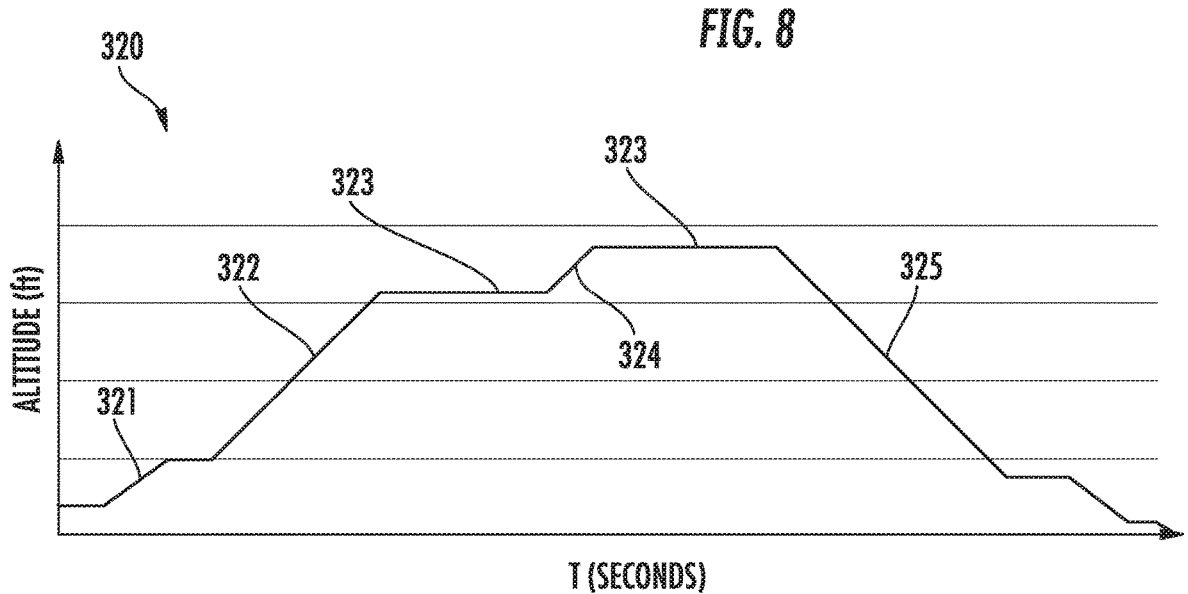
FIG. 9 provides an exemplary flight profile depicting various phases of flight according to exemplary embodiments of the present subject matter.

With reference to FIGS. 9 and 10, FIG. 9 provides an exemplary flight profile depicting various flight phases and FIG. 10 provides a chart depicting severity thresholds 254 for various flight phases 280 in accordance with exemplary embodiments of the present subject matter. As shown in FIG. 9, exemplary flight profile 320 includes a takeoff phase 321, a climb phase 322, a cruise phase 323 with one step climb 324, and a descent phase 325. Other flight phases not expressly listed are also contemplated, such as an aborted landing (go-around or wave-off), maneuvering or aerobatic flight phases for military applications.

As will be appreciated, the clearance control schedules contained in the FADEC engine controllers 206 will schedule the blade tip clearances CL to be more open or more closed depending on the phase of flight. Generally, the blade tip clearances CL are set more open during the takeoff phase 321, the climb phase 322, and the descent phase 325, and less open in the cruise phase 323 where less throttle movement is expected. The data points 252 are filtered by phase, and based on the flight phase in which a particular data point falls, a phase-specific severity threshold 254 is retrieved from the severity threshold library 257 and utilized to execute method (400). As an example, the data points 252 could be filtered by takeoff, climb, cruise, and descent phases 321, 322, 323, 325 and then one or more phase-specific severity thresholds 254 can be used to compare the filtered data points 252 to the phase-specific severity threshold 254.

As depicted in FIG. 10, phase-specific severity thresholds 326 are shown for the takeoff, climb, descent, and cruise phases 321, 322, 323, 325 in a flight phase chart 331. More specifically, a takeoff phase-specific severity threshold 327, a climb phase-specific severity threshold 328, a cruise phase-specific severity threshold 329, and a descent phase-specific severity threshold 330 are shown in FIG. 10. As noted above, as the clearance control schedules are set generally more closed during the cruise phase 323, the cruise-phase specific severity threshold 329 is shown as more restrictive than the takeoff, climb, descent phase-specific severity thresholds 327, 328, 330. Meaning, the magnitude and rate of a particular power level change 240 in the cruise phase 323 cannot be as significant or as fast as those made in the other flight phases before the data point 252 associated with that particular power level change is deemed beyond the severity threshold. And conversely, as the clearance control schedules are set more open during the takeoff, climb, and descent phases 321, 322, 325, these phase-specific severity thresholds 327, 328, 330 are less restrictive. Accordingly, larger and faster power changes can be made at these phases 321, 322, 325 without the data point 252 being deemed beyond the severity threshold. It will be appreciated that in other alternative embodiments, phase-specific severity thresholds 326 can be determined by filtering the engine operating data 242 into flight phases 280 before identifying and calculating the power level changes and defining data points 252 associated with those power level changes 240.

Various flight conditions, such as altitude 274 and Mach number 276, can be used to filter the data points 252 by altitude and/or Mach number such that an altitude-specific or a Mach number-specific severity threshold can be determined and retrieved from the severity threshold library 257 for use in executing method (400).

Generally, at lower altitudes and Mach numbers, more throttle movement is expected (i.e., more power level changes) and thus the blade tip clearance gaps CL are kept relatively open by the FADEC engine controllers 206 or other computing devices 210 in these low altitude or low Mach number operating conditions. In comparison, at higher altitudes and Mach numbers, less throttle movement is expected (i.e., less power level changes) and thus the blade tip clearance gaps CL are kept relatively tight or closed by the FADEC engine controllers 206 or other computing devices 210.

FIG. 11 provides an altitude chart 332 depicting altitude-specific severity thresholds 334 for various altitudes according to exemplary embodiments of the present subject matter. In particular, altitude-specific severity thresholds 334 are shown for altitudes of 10,000 feet (ft.) denoted as 335, 20,000 ft. denoted as 336, 30,000 ft. denoted as 337, and 40,000 ft. denoted as 338. The altitude-specific severity threshold 337 for 40,000 ft. is the most restrictive, as very few power level changes can be expected at this altitude, at least with respect to civil or commercial aircraft. And as shown, the altitude-specific severity thresholds 334 become less restrictive as altitude decreases, as more power level changes can be expected at lower altitudes. Accordingly, the magnitude and rate of a particular power level change at a higher altitude cannot be as significant or as fast as those made at lower altitudes before the data point 252 associated with that particular power level change is deemed beyond the severity threshold. And conversely, the magnitude and rate of a particular power level change at a lower altitude can be faster and/or more significant in magnitude than those made at higher altitudes before the data point 252 associated with that particular power level change is deemed beyond the severity threshold. It will be appreciated that the 10,000 ft. intervals of the altitude-specific severity thresholds 334 was set for exemplary purposes and that any suitable interval is contemplated, such as every 2,000 or 5,000 ft.

FIG. 12 provides a Mach number chart 340 depicting Mach number-specific severity thresholds 342 for various Mach numbers according to exemplary embodiments of the present subject matter. Mach number-specific severity thresholds 342 are shown for Mach numbers of 0.5 denoted as 343, 0.6 denoted as 344, 0.7 denoted as 345, and 0.8 denoted as 346. The Mach-number specific severity threshold 346 for 0.8 is the most restrictive in this example, as fewer power level changes are expected at this Mach number, at least with respect to civil or commercial aircraft. And as shown, the severity thresholds 342 become less restrictive as the Mach number decreases, as more power level changes are expected as the Mach number of the aircraft during flight decreases. Thus, the magnitude and rate of a particular power level change at a higher Mach number cannot be as significant or as fast as those made at lower Mach numbers before the data point 252 associated with that particular power level change is deemed beyond the severity threshold. Conversely, the magnitude and rate of a particular power level change at a lower Mach number can be faster and/or more significant in magnitude than those made at higher Mach numbers before the data point 252 associated with that particular power level change is deemed beyond the severity threshold. It will be appreciated that the intervals between the Mach number-specific severity thresholds 342 are for exemplary purposes and that the interval could be any suitable interval.

The absolute power 278 of exemplary aircraft 200 when a given power level change 240 is made can also be used to filter the data points 252. In particular, the data points 252 can be filtered by absolute power 278 such that an absolute power-specific severity threshold 254 can be determined and retrieved from the severity threshold library 257 for use in carrying out method (400).

FIG. 13 provides an absolute power chart 350 depicting absolute power-specific severity thresholds 352 for various absolute power levels according to exemplary embodiments of the present subject matter. Absolute power-specific severity thresholds 352 are shown for power levels of 90% N1K denoted as 353, 75% N1K denoted as 354, 60% N1K denoted as 355, and 45% N1K denoted as 356. The power levels represent the ending absolute corrected fan speed (i.e., the corrected fan speed after the power level change has been made). The power level-specific severity threshold 353 for 90% N1K is the most restrictive severity threshold in this example, as ending power level changes at this absolute power level generally place more severe loads on the turbomachinery components than power level changes at lower ending absolute power levels. As shown, the severity thresholds 352 become less restrictive as the ending power level decreases in percentage. For instance, absolute power-specific severity threshold 354 for 75% N1K is less restrictive than the absolute power-specific severity threshold 353 for 90% N1K, the absolute power-specific severity threshold 355 for 60% N1K is less restrictive than the absolute power-specific severity threshold 354 for 75% N1K, and the absolute power-specific severity threshold 356 for 45% N1K is less restrictive than the absolute power-specific severity threshold 355 for 60% N1K.

Accordingly, the magnitude and rate of a particular power level change at a higher ending absolute power level cannot be as significant or as fast as those made at lower ending absolute power levels before the data point 252 associated with that particular power level change is deemed beyond the severity threshold. And conversely, the magnitude and rate of a particular power level change at a lower ending power level change can be faster and/or more significant in magnitude than those made at higher ending power levels before the data point 252 associated with that particular power level change is deemed beyond the severity threshold 254. It will be appreciated that the ending power levels shown in FIG. 13 are for exemplary purposes and that other suitable intervals of ending power level changes could be chosen. For instance, an absolute power level-specific severity threshold 352 could be set at 5% N1K intervals. In addition, it will also be appreciated that any suitable method for determining an ending power level is contemplated. For example, a percent of N2K could be used.

Engine utilization 282 of the turbine engine 100 can also be used to filter the data points 252. In particular, the data points 252 can be filtered by engine utilization (i.e., the amount of time or cycles the engine has been in service) such that an engine utilization-specific severity threshold can be determined and retrieved from the severity threshold library 257 for use in carrying out method (400).

Increased utilization of the engine, which can be measured via operating time, number of cycles, performance trending, etc., may make it more likely that turbine engine 100 has already experienced one or more rub events, blade loss, deterioration, etc. Engine performance deteriorates over the service life of the engine due to blade tip loss, fouling, erosion, and wear, among other things. In short, the more blade tip loss and/or deteriorated an engine becomes, the less likely the blade tips will interfere with the casings. And conversely, the less blade tip loss and/or engine deterioration, the more likely the blade tips will interfere or rub with a surrounding casing, assuming the same magnitude and rate of power level change is used for the comparison. Engine lifing and deterioration models can be used to predict the number of rub events and/or engine deterioration that typically occurs at certain intervals throughout an engine's operating life.

FIG. 14 provides an engine utilization chart 360 depicting engine utilization-specific severity thresholds 362 for various flight cycles of operation since refurbishment or new build according to exemplary embodiments of the present subject matter. Various engine utilization-specific severity thresholds 362 are shown for operating times of 1,000 cycles denoted as 363, 2,000 cycles denoted as 364, 3,000 cycles denoted as 365, and 4,000 cycles denoted as 366. The engine utilization-specific severity threshold 363 for 1,000 hrs is the most restrictive severity threshold in this example, as the turbomachinery components are likely to have less damage and blade tip loss than the other operating times depicted. As shown, the engine utilization-specific severity thresholds 362 become less restrictive as the engine operating time increases. For instance, the engine utilization-specific severity threshold 364 for 2,000 cycles has a less restrictive severity threshold than the engine utilization-specific severity threshold 363 for 1,000 cycles, the engine utilization-specific severity threshold 365 for 3,000 cycles is less restrictive than the engine utilization-specific severity threshold 364 for 2,000 cycles, and the engine utilization-specific severity threshold 366 for 4,000 cycles is less restrictive than the engine utilization-specific severity threshold 365 for 3,000 cycles. It will be appreciated that the measure of flight cycles is for exemplary purposes and that other suitable measures of utilization could be employed, including hours of operation since refurbishment, performance degradation in measured EGT margin established by trending, or performance degradation in fuel consumption established by trending.

Accordingly, the magnitude and rate of a particular power level change at a lower engine operating time cannot be as significant or as fast as those made at higher engine operating times before the data point 252 associated with that particular power level change is deemed beyond the severity threshold. Conversely, the magnitude and rate of a particular power level change at a higher operating time can be faster and/or more significant in magnitude than those made at lower operating times before the data point 252 associated with that particular power level change is deemed beyond the severity threshold. It will be appreciated that other operating times or intervals could be chosen.

Generally, it will be appreciated that the operating parameter-specific severity thresholds can be adjusted by the machine learning technique or other suitable technique such that when the data points 252 are compared to the severity threshold 254, the identification of rub events is more accurate.

In one aspect, the data points 252 can be filtered by more than one operating parameter 270. By filtering the data points 252 by the operating parameters 270, a resultant severity threshold, denoted by 254, can be calculated by one or more computing device(s) 210 or engine controller(s) 206 and utilized to carry out method (400).

In some embodiments, severity thresholds for various aircraft attitudes and/or rate of change of aircraft attitude 283 may be employed. These aircraft-induced and gyroscopic loads on the engine may affect the blade tip clearances of the HP and/or LP turbines, HP and/or LP compressors, and potentially the fan. For instance during rotation or during an extreme banking maneuver one or more of the rotating turbomachinery and/or fan rotating components may rub against a corresponding stationary component. The most restrictive attitude severity threshold would be those attitude changes or rate of attitude change that are the most extreme or executed or performed the quickest. The attitude severity thresholds may become less restrictive as the attitude change or rate of attitude change decreases.

FIG. 15 provides a chart 370 depicting a resultant severity threshold 254 according to exemplary embodiments of the present subject matter. In this example, a particular data point 252 corresponds to a magnitude and rate of a power level change that was executed in cruise phase 323 in which the aircraft had an altitude of 38,000 ft., a Mach number of 0.8, an ending absolute power level of 85% N1K, and a current operating life of 10,000 hrs. The data point 252 is filtered by the operating parameters 270, the specific severity thresholds for flight phase 326, altitude 334, Mach number 342, absolute power 352, and engine utilization 362 corresponding to the known operating parameters 270 are retrieved from the severity threshold library 257, and then one or more processor(s) 222 of one or more computing device(s) 210 or engine controller(s) 206 calculate the resultant severity threshold 254. For this exemplary embodiment, the resultant severity threshold 254 is a function that takes into account all of the specific severity thresholds 326, 334, 342, 352, 362 and then calculates the most restrictive curve or function. As shown in FIG. 15, for significant magnitude changes at relatively low rates of change, the altitude specific-severity threshold 334 for 38,000 ft. is the most restrictive severity threshold. Then, as the rate increases, the Mach number specific-severity threshold 342 for 0.8 is the most restrictive severity threshold. Then, for very quick rates and relatively small magnitude power level changes, the cruise phase specific-severity threshold 326 for the cruise phase 323 is the most restrictive severity threshold. The absolute power-specific severity threshold 352 for 85% N1K and the engine utilization-specific severity threshold 362 for 10,000 hrs are not the most restrictive severity thresholds in the chart 370; thus, they are not utilized in calculating the function of the resultant severity threshold 254. As illustrated, the resultant severity threshold 254 (shown by the solid line) is a function of the most restrictive operating parameter-specific severity thresholds.

With reference again to FIGS. 4 and 7, at (412), the data point(s) 252 are compared to the severity threshold 254 to identify possible rub events 256. As noted above, severity threshold 254 could be a generic severity threshold, a severity threshold specific to one operating parameter, or may be a resultant severity threshold based on more than one operating parameter 270. As shown in FIG. 7, a vast majority of data points 252 fall below the severity threshold 254 as benign, normal operation data points. Arrow 266 denotes a direction that is below the severity threshold 254. Minimum clearance data points 253 are shown generally just below the severity threshold 254 encircled by a dashed line, and as noted previously, these minimum clearance data points 253 can be used to initially set the severity threshold 254 and to later update or refine the severity threshold 254 over the service life of the turbine engine 100. Some data points 252 may be beyond the severity threshold 254 as shown, and thus may ultimately be identified or flagged as possible rub events 256. An arrow 268 denotes a direction that is beyond the severity threshold 254.

It should be noted that in some exemplary embodiments, although not shown in FIG. 4, one or more of the data points 252 can be screened out as non-rub events where the magnitude of the power level change of a particular data point is below a predetermined magnitude threshold. In a similar fashion, one or more of the data points 252 can be screened out as non-rub events where the rate of the power level change of a particular data point is below a predetermined rate threshold. The thresholds can be set as the rate and magnitude asymptotes 262, 264, for example, with the predetermined rate threshold corresponding to the rate asymptote 262 and the predetermined magnitude threshold corresponding to the magnitude asymptote 264. In other embodiments, the thresholds can be set differently than the asymptotes. Although the data points falling below the predetermined magnitude and rate thresholds would likely eventually be identified as non-rub events when compared to the severity threshold 254, utilizing the thresholds to screen out the data points 252 may require less computational intensive operations, as the severity threshold 254 may be a more complex, adjustable function as opposed to a more static rate and/or magnitude threshold function.

Once the data points 252 are compared to the severity threshold 254, at (414) of method (400), it is determined whether one or more of the data points 252 are beyond the severity threshold 254. For this embodiment, if the data point 252 falls below the severity threshold 254, the data point 252 is identified as a non-rub event at (416) (i.e., the data point is no longer considered a possible rub event as the probability that a rub event actually occurred at the particular magnitude and rate of power level change is very low). Conversely, if the data point 252 is beyond the severity threshold 254, the data point 252 is identified as a possible rub event 256 and continues through method (400) as shown.

In some exemplary embodiments, a critical severity threshold 259 can be set beyond and mirroring the severity threshold 254 at a predetermined margin as shown in FIG. 7. For example, the critical severity threshold 259 could be set apart from the severity threshold 254 by about a ten percent margin (10%) or more (i.e., the critical severity threshold 259 is beyond the severity threshold 254 by more than about ten percent (10%)), by about a fifteen percent (15%) or more, or by about a twenty percent (20%) margin or more, for example. The critical severity threshold 259 is set such that data points 252 beyond this margin have very likely caused a rub event that requires immediate attention to the turbomachinery components of the core turbine engine 106. Accordingly, when a data point 252 is beyond the critical severity threshold 259, although not shown, the method (400) includes sending, in real time, a critical rub event signal. The critical rub event signal could be sent to and displayed to the pilot of aircraft 200 via display 214, it could be sent to one or more computing device(s) 210 of off board system 218 and/or cloud computing environment 216 such that one or more of the computing device(s) 210 can schedule an immediate inspection of the turbine engine 100, one or more computing device(s) 210 or engine controllers 206 can communicate with the ACC system 194 to modify the blade tip clearance schedules to account for the likely blade tip loss, or ground crew maintenance teams could be notified of the possible rub event such that the engine can be removed from service or overhauled.

In other exemplary embodiments, in cases where the engine is relatively new or the severity threshold 254 has just been adjusted or retrained, then some margin of error with respect to the severity threshold 254 may be employed. In this respect, a predetermined margin threshold 258 can be set below the severity threshold 254 by a predetermined margin. For example, the predetermined margin threshold 258 could be set below the severity threshold 254 by about twenty percent (20%) or more, by about about ten percent (10%) or more, by about five percent (5%) or more, or by about two percent (2%) or more. It will be appreciated that the predetermined margin threshold 258 can be adjusted as more engine operating data 242 becomes available and that the margin 258 can be adjusted based at least in part on various factors, such as how refined the severity threshold 254 is and how accurate the severity threshold has been in the past at identifying rub events for a particular engine model. In some exemplary embodiments, if a particular data point 252 is below the severity threshold 254 and not within about a predetermined margin threshold 258 (i.e., not between the severity threshold 254 and the predetermined margin threshold 258), the data point 252 is screened out as a non-rub event. But if the data point 252 is below the severity threshold 254 but within the predetermined margin threshold 258, the data point 252 is labeled or denoted as a possible rub event 256.

With reference again to FIG. 4, once it is determined that one or more data points 252 are beyond the severity threshold 254, at (418) the data points 252 are screened based at least in part on one or more operating parameters 270. To screen the data points 252, at (420) of method (400) it is determined whether a particular data point 252 is within a predetermined set of operating parameters. If the data point 252 is within the predetermined set of operating parameters, then at (422), the data point 252 is identified as a possible rub event. If the data point 252 is not within the predetermined set of operating parameters, then the data point 252 is identified as a non-rub event at (416), as shown in FIG. 4.

In some exemplary embodiments, the data points 252 can be screened by the ending absolute power level 278 of the engine. For example, if the ending absolute power level 278 of the engine is below a certain threshold when the power level change was made, such as less than or equal to about 50% N1K, then the data points 252 are deemed not to be within the predetermined set of operating parameters. If the data point 252 is not within the predetermined set of operating parameters, then as noted above, the data point 252 is identified as a non-rub event at (416). Conversely, if the data point 252 is within the predetermined set of operating parameters, or above about 50% N1K in this case, then the data point 252 is identified as a possible rub event at (422).

The dwell time 272 is another operational parameter 270 that may be considered at (418). The dwell time 272, in this context, is the time period the aircraft 200 maintains a low power level before making a power level increase.

The clearance gaps CL between turbine blade tips and the surrounding casings (shrouds) may be impacted by two main types of loads: power-induced engine loads and flight loads. Power-induced engine loads generally include centrifugal, thermal, internal pressure, and thrust loads. Flight loads generally include inertial, aerodynamic, and gyroscopic loads. In the context of dwell time 272, centrifugal and thermal engine loads are of most concern, as these loads are responsible for the largest radial variation in blade tip clearance gaps CL. With regard to the centrifugal load, the rotor assemblies of the turbine engine may mechanically expand or contract depending on its rotational speed. Generally, the faster the rotational speed of the rotor, the greater its mechanical expansion and thus the further radially outward the rotor blades extend. Conversely, the slower the rotational speed of the rotor, the less mechanical expansion it experiences and thus the further radially inward the blades extend. With regard to thermal loads, as the engine heats up or cools down due at least in part to power level changes, the rotor and casings thermally expand and/or contract at differing rates. That is, the rotor is relatively large and heavy, and thus its thermal mass heats up and cools down at a much slower rate than does the relatively thin and light casings. Thus, the thermal mass of the casings heat up and cool off much faster than the rotor. Accordingly, as an aircraft's engine makes power level changes, the rotor and casings contract and expand at different rates. Meaning, they are sometimes not thermally matched. This leads to changes in the clearance gaps CL, and in some cases, rub events.

Figure 16:
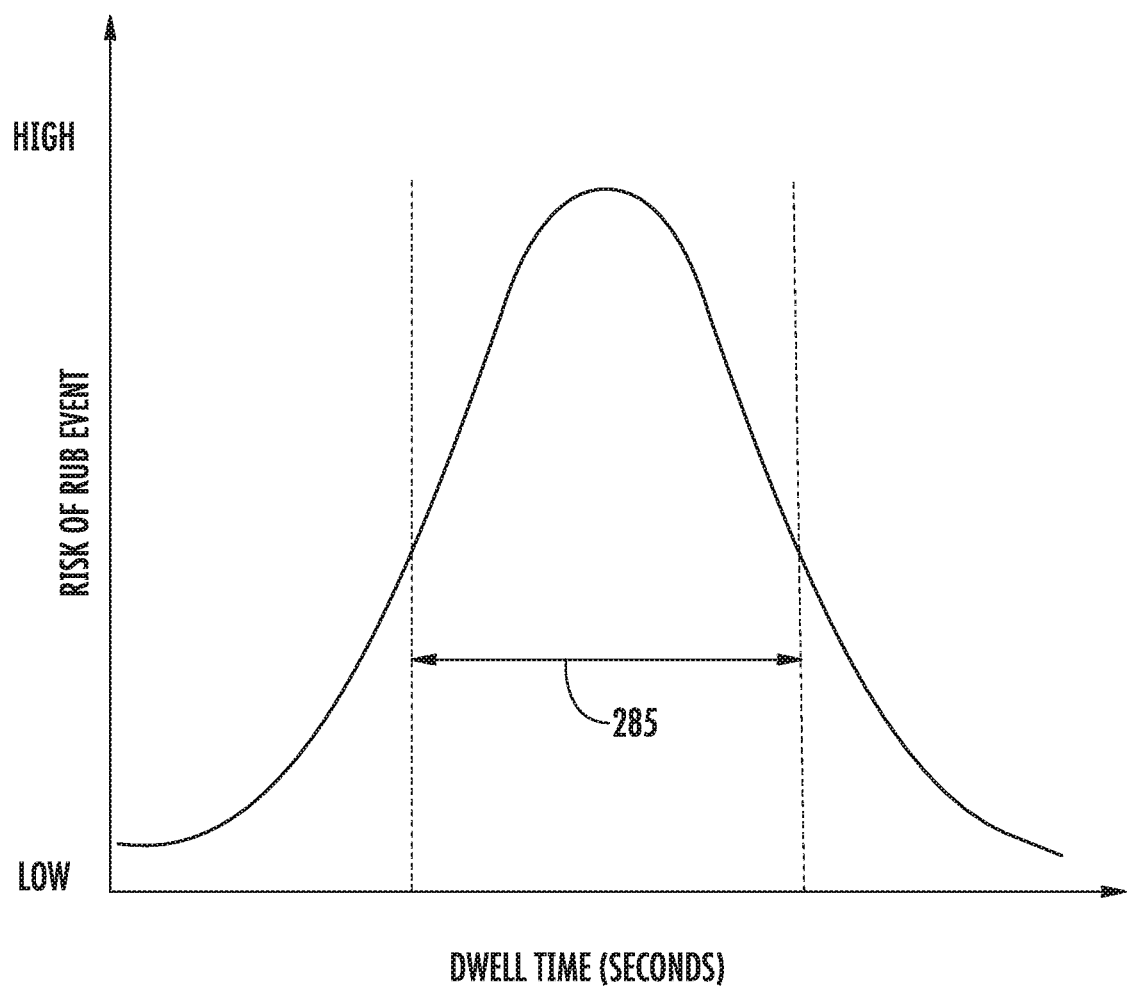
FIG. 16 provides a risk of rub event versus dwell time at low power prior to a power level increase chart according to exemplary embodiments of the present subject matter.

FIG. 16 provides a risk of rub event versus dwell time at low power prior to a power level increase chart according to exemplary embodiments of the present subject matter. As shown, where an engine dwells at low power for a relatively short time period prior to a power level increase, there is a relatively low risk that the engine will experience a rub event because the rotor of the engine is still hot and expanded radially outward. Likewise, the case is also still hot and expanded radially outward, as the case has not yet had a chance to cool. Thus, the rotor and the casings are thermally matched and consequently there is a low risk that a rub event will occur during a subsequent power level increase of the turbine engine.

For a relatively long dwell time at low power prior to a power level increase, the case is afforded enough time to cool off. Likewise, the rotor also has enough time to cool off. Thus, the rotor and case are both contracted radially inward and are thermally matched. Accordingly, there is a low risk that a rub event will occur during a subsequent power level increase of the turbine engine.

The risk of a rub event is much greater at a dwell time somewhere between the relatively short dwell time and the relatively long dwell time as shown in FIG. 16. The dwell time range 285 is a range of dwell times at lower power prior to a power level increase of gas turbine engine 100 in which the case has had enough time to cool off and thus contracts inward, but the rotor has not had enough time to cool off and is thus still expanded outward. This creates a thermally mismatched pinch point condition. When the centrifugal load of the rotor causes mechanical growth during a subsequent power level increase, the blade tip clearance is "pinched" closer to the casings and the likelihood of a rub event is increased. It will be appreciated that the dwell time range 285 could be set based on several factors, such as engine design (e.g., casing thickness and mass, rotor thickness and mass, efficiency of active clearance control flows to cool or heat the casings, internal engine temperature and pressure, etc.), clearance control schedules, engine deterioration, etc. In one exemplary embodiment, the dwell time range 285 could be between about five seconds (5) and fifteen seconds (15). In other exemplary embodiments, the dwell time range 285 could be between about five (5) seconds and five minutes (5).

Figure 17:
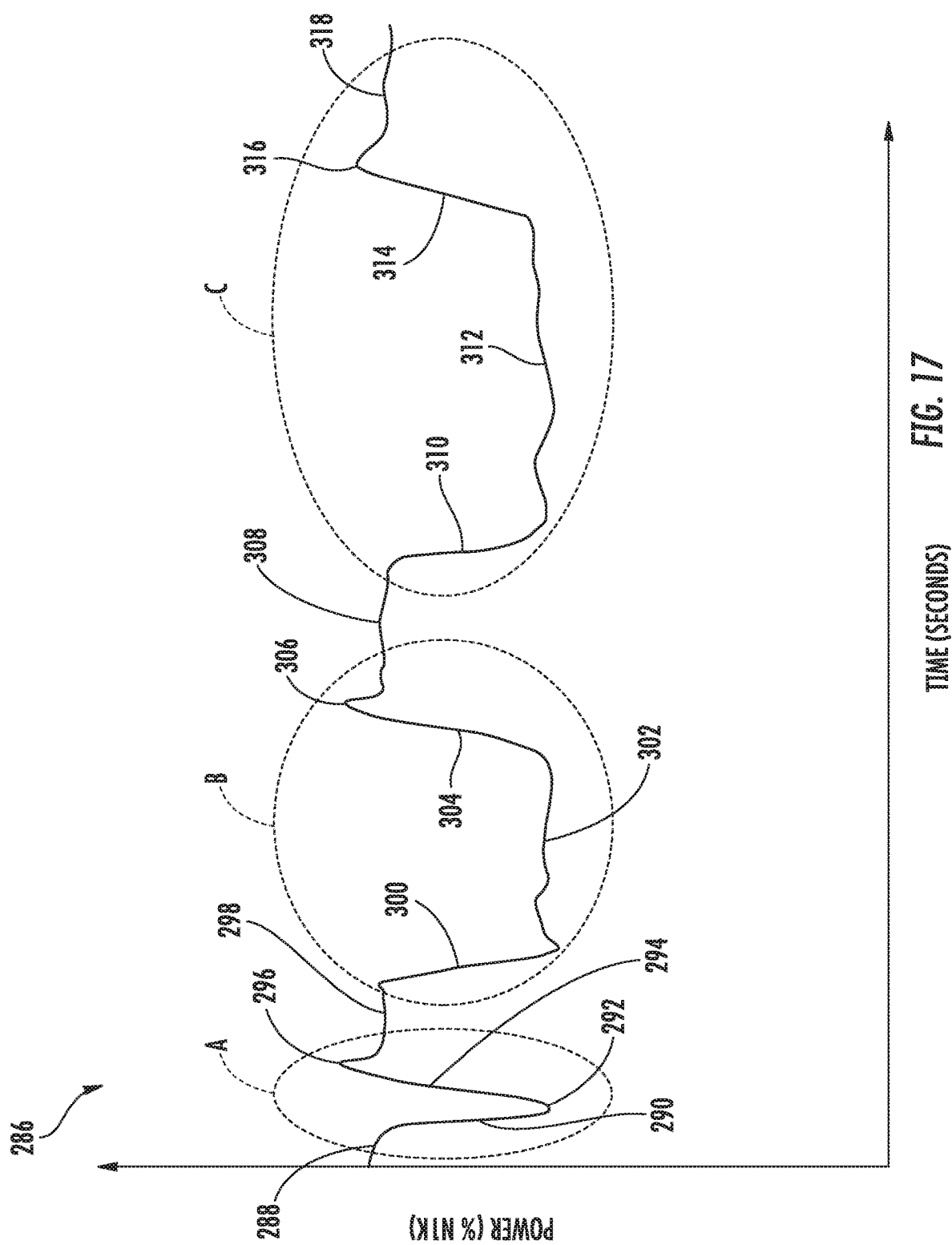
FIG. 17 provides a power versus time chart showing three instances of power level increases according to exemplary embodiments of the present subject matter.

By way of example, with reference now to FIG. 17, a chart 286 depicting a FADEC trace of the power level (% N1K) of gas turbine 100 engine versus time (seconds) is provided. With reference first to Segment A, at 288, the gas turbine engine 100 is performing a cruise operation and is maintaining a relatively stable power level. Then, turbine engine performs a rapid power level decrease (deceleration) at 290. At 292, the turbine engine dwells at a low power level for a relatively short period of time before the power level is rapidly increased at 294. The power increase at 294 extends into an overshoot 296 before the power level of the turbine engine stabilizes at 298. In Segment A, as the dwell time 272 is a relatively short period of time, which is a time in which both the rotor and casings of the engine are not allowed to cool in Segment A, there is a relatively low risk that a rub event occurred during the power level increase at 294. Even though the magnitude and the rate of the power level change at 294 was significant, because the engine dwelled at a low power level for a relatively short period of time prior to the increase, a rub event is unlikely to have occurred. Thus, a data point 252 associated with this particular power level change, namely the power level increase at 294, can be screened and determined (418, 420) to be not within predetermined operating parameters as the data point fall outside of the dwell time range 285. And thus, at (416) of method (400) the data point 252 is identified as a non-rub event.

With reference now to Segment B of FIG. 17, at 298, the power level of the turbine engine is relatively stable for a period of time. At 300, a rapid power decrease is performed. At 302, the turbine engine 100 dwells at a power level for a time before the power level is rapidly increased at 304 and into an overshoot 306 before stabilizing again at 308. At 302, the power level was allowed to dwell at a low power level for a predetermined time prior to making the power level increase at 304. In Segment B, the predetermined time dwelling at low power prior to the power level increase was such that the engine casings had enough time to cool off (and thus were allowed to contract radially inward) but the rotor did not have enough time to cool off (and thus remained expanded radially outward). Thus, this dwell time at low power prior to a power level increase falls within the dwell time range 285. Thus, in this circumstance, a blade tip rub event may be likely, and the faster the rate of the power level change and the greater the magnitude of the power level change increases the likelihood of a blade tip rub event. And therefore, the data point 252 associated with this particular power level change, namely the power level change at 304, can be screened and determined (418, 420) to be within predetermined operating parameters as the data point falls within the dwell time range 285. And thus, at (422) of method (400), the data point 252 is identified as a possible rub event.

With reference now to Segment C of FIG. 17, at 308, the power level of the turbine engine is relatively stable for a period of time. At 310, a rapid power level decrease is performed. At 312, the turbine engine 100 dwells at a power level for a relatively long period of time before the power level is rapidly increased at 314. The power level is increased into an overshoot 316 before stabilizing at 318. In Segment C, as the dwell time 272 is a relatively long period of time, a time in which both the rotor and casings of the engine are allowed to cool, there is a relatively low risk that a rub event occurred during the power level increase at 314. Even though the magnitude and the rate of the power level change at 314 was significant, because the engine dwelled at a low power level for a relatively long period of time prior to the power level increase, a rub event is unlikely to have occurred. Thus, a data point 252 associated with this particular power level change, namely the power level increase at 314, can be screened and determined (418, 420) to be not within predetermined operating parameters as the data point fall outside of the dwell time range 285. And thus, at (416) of method (400) the data point 252 is identified as a non-rub event.

Aside from ending absolute power 278 and dwell time 272, other operating parameters 270 can be used to screen the data points 252. For example, the data points 252 can be screened based at least in part on the altitude of the aircraft 200, the Mach number 276, the flight phase 280, and/or the engine utilization 282, among other exemplary operating parameters 270 of the gas turbine engine 100.

With reference again to FIG. 4, as noted above, after screening (418) and determining (420), the data points 252 are identified either as non-rub events at (416) or as rub events at (422).

Figure 18:
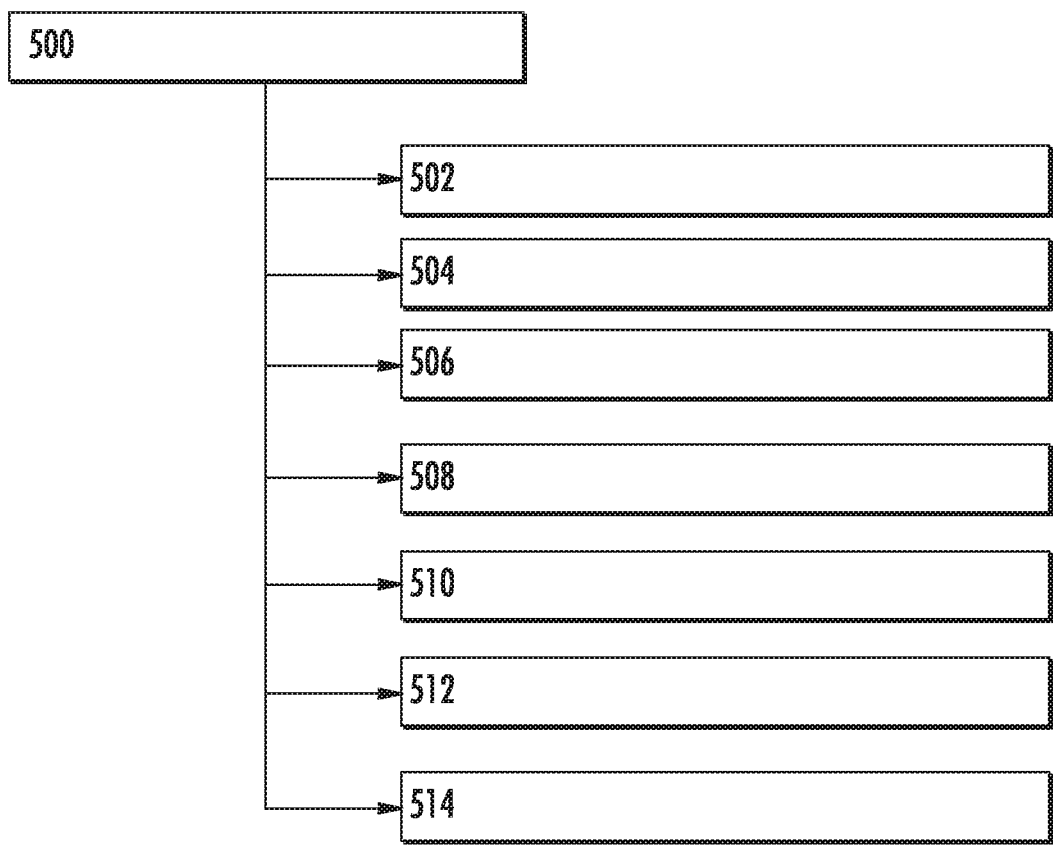
FIG. 18 provides a list depicting various actions that can be taken after a possible rub event has been identified according to exemplary embodiments of the present subject matter.

FIG. 18 provides a list of exemplary actions 500 to take if one or more data points 252 are identified as possible rub events 256.

At 502, for example, where the system indicates that a severe rub event may have occurred, an alert can be sent to an aircraft maintenance team such that the rub event can be addressed when the aircraft lands or the engine can be removed from service for maintenance or discarded.

At 504, a borescope inspection of the engine can be scheduled to look for tip loss. If tip loss is evident through a borescope or similar inspection, and the engine has the capability, the ACC system 194 can be trimmed to run more closed to compensate for the loss of material.

At 506, the pilot or operator can be alerted through display devices 214 that a potential rub event has occurred. Accordingly, the pilot or operator can curve his or her techniques so as to reduce the severity of operation and improve the performance retention and on-wing life of the engine. For example, the pilot can fly with a lighter load, use derated thrust for takeoff and/or climb, and utilize aircraft on routes with lower altitude airports.

At 508, the data points 252 associated with the possible rub events 256 can be incorporated into cumulative damage models and used to target inspections to identify distressed hardware.

At 510, the data points 252 can be used to identify the frequency and magnitude of severe operation of the gas turbine engine 100 to select modules and parts (blades/vanes/shrouds/seals) to be replaced during an overhaul or shop visit.

At 512, the data points 252 associated with possible rub events 256 and confirmed as rub events can be used to refine the severity boundary 254.

At 514, the data points 252 associated with possible rub events 256 and confirmed or determined to be actual rub events can be used to update the severity threshold 254. Updating could be adjusting or refining the severity threshold 254 or updating could be a confirmation that the severity threshold 254 is accurately predicting rub events. Updating the severity threshold 254 based on data points 252 confirmed as actual rub events may allow for accurate prediction of rub events even with shifts in fielded engine performance. In other words, the data points 252 can be used to adjust the severity threshold 254 over the service life of the gas turbine engine 100 as the engine deteriorates over time.

It will be appreciated that other exemplary actions 500 can be taken in response to identification of a possible rub event 256.

Figure 19:
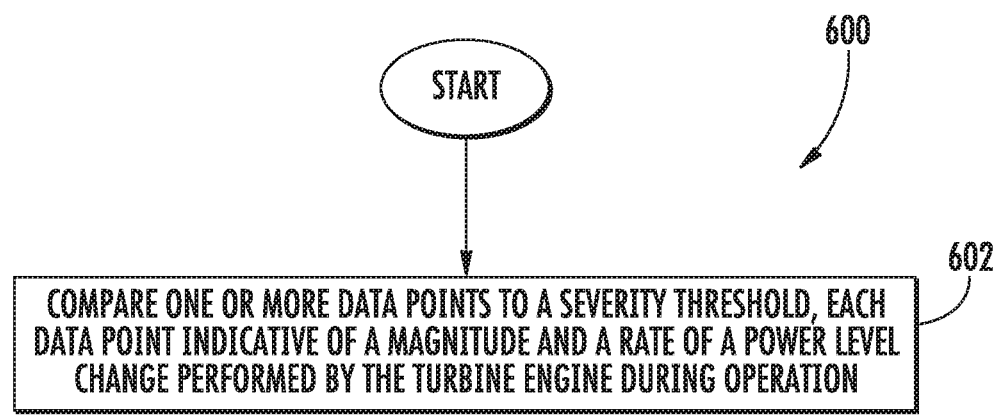
FIG. 19 provides a flow diagram of an exemplary method for identifying rub events according to exemplary embodiments of the present subject matter.

FIG. 19 provides a flow diagram of an exemplary method (600) for identifying a rub event of exemplary turbine engine 100. For this embodiment, at (602), the method (600) includes: comparing one or more data points 252 to a severity threshold 254. Each data point 252 is indicative of a magnitude and a rate of a power level change performed by the turbine engine 100 during operation.

The technology discussed herein makes reference to computer-based systems and actions taken by and information sent to and from computer-based systems. It will be appreciated that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of identifying a rub event between a rotating component and a stationary component of a turbine engine, the method comprising:
   comparing, by one or more computing devices, one or more data points to a severity threshold, each data point of the one or more data points is defined by a magnitude and a rate of a power level change performed by the turbine engine during operation;
   determining, by the one or more computing devices, whether the one or more data points are beyond the severity threshold based on the comparing, wherein when a particular data point of the one or more data points is beyond the severity threshold, the particular data point is identified as being associated with a possible rub event; and
   performing, in response to the particular data point being identified as being associated with the possible rub event, a control action.

2. The method of claim 1, wherein during the comparing, if the particular data point is below the severity threshold, the particular data point is screened out as being associated with a non-rub event.

3. The method of claim 2, wherein the method further comprises:
   determining whether the particular data point identified as being associated with the possible rub event is associated with an actual rub event, and
   updating the severity threshold based at least in part on the particular data point determined to be associated with the actual rub event.

4. The method of claim 1, wherein during comparing, if a particular data point of the one or more data points is below the severity threshold and not within a predetermined margin of the severity threshold, the particular data point is screened out as being associated with a non-rub event.

5. The method of claim 1, wherein the method further comprises:
   filtering the one or more data points based at least in part on one or more operating parameters indicative of conditions of the turbine engine during the power level change to determine a specific severity threshold that corresponds to the one or more operating parameters, wherein when the one or more data points are compared to the severity threshold, the specific severity threshold is used as the severity threshold.

6. The method of claim 5, wherein the one or more operating parameters include at least one of: a dwell time prior to performing the power level change, an altitude, a Mach number, an absolute power level, a flight phase, an aircraft attitude or a rate of change in the aircraft attitude, and an engine utilization.

7. The method of claim 5, wherein during filtering, the one or more data points are filtered based at least in part on two or more of the one or more operating parameters of the turbine engine indicative of the conditions of the turbine engine during the power level change, each operating parameter of the one or more operating parameters having a corresponding specific severity threshold; wherein the method further comprises:
   calculating a resultant severity threshold based at least in part on the specific severity thresholds that correspond to their respective operating parameters, wherein when the one or more data points are compared to the severity threshold, the resultant severity threshold is used as the severity threshold.

8. The method of claim 1, wherein the method further comprises:
   determining whether the one or more data points are within one or more predetermined operating parameters; and
   screening out particular data points from the one or more data points as being associated with a non-rub events if a particular data point is not within the one or more predetermined operating parameters.

9. The method of claim 8, wherein the power level change is a power level increase, and wherein one of the predetermined operating parameters is a dwell time range, wherein the dwell time range is indicative of a predetermined range of times in which the turbine engine dwells prior to the power level increase.

10. The method of claim 1, wherein the method further comprises:
    screening out the one or more data points as non-rub events when the magnitude of the power level change is below a predetermined magnitude threshold; and
    screening out the one or more data points as non-rub events when the rate of the power level change is below a predetermined rate threshold.

11. The method of claim 1, wherein the method further comprises:
    obtaining engine operating data indicative of the power level change performed by the turbine engine during operation; and
    identifying the power level change of the turbine engine; and
    calculating the magnitude and the rate of the power level change.

12. The method of claim 11, wherein performing the control action comprises trimming an active clearance controls system of the turbine engine such that clearances between the rotating component and the stationary component are more closed during operation of the turbine engine.

13. The method of claim 11, wherein the engine operating data is further indicative of one or more minimum clearance data points, the minimum clearance data points indicative of one or more known maneuvers or sequences where minimum clearance is anticipated, and wherein the method further comprises:
updating the severity threshold based at least in part on the one or more minimum clearance data points.

14. The method of claim 1, wherein the method further comprises:
plotting the one or more data points on a chart, wherein the chart comprises a magnitude of power change axis and a rate of power change axis;
wherein the severity threshold is an asymptotic function plotted along the chart, and wherein as the asymptotic function increases along the rate of power change axis, the asymptotic function approaches a magnitude asymptote, and wherein as the asymptotic function increases along the magnitude of power change axis, the asymptotic function approaches a rate asymptote.

15. The method of claim 1, wherein when the data point is beyond a critical severity threshold, the method further comprises:
sending, in real time, a critical rub event signal.

16. The method of claim 15, wherein the critical severity threshold is set beyond the severity threshold by a ten percent margin (10%) or more.

17. A method of identifying a rub event between a rotating component and a stationary component of a turbine engine, the method comprising:
filtering one or more data points based at least in part on one or more operating parameters to determine a specific severity threshold that corresponds to each of the one or more operating parameters, each data point of the one or more data points is defined by a magnitude and a rate of a power level change performed by the turbine engine during operation and the one or more operating parameters indicative of conditions of the turbine engine during the power level change;
comparing the one or more data points to a severity threshold, wherein when the one or more data points are compared to the severity threshold, a resultant severity threshold is used as the severity threshold, wherein the resultant severity threshold is determined based at least in part on the one or more specific severity thresholds;
determining whether the one or more data points are within one or more predetermined operating parameters; and
screening out particular data points from the one or more data points as being associated with non-rub events if the particular data points are not within the one or more predetermined operating parameters; and
identifying the one or more data points beyond the severity threshold and not screened out as being associated with non-rub events as rub events; and
performing, in response to the one or more data points being identified as rub events, a control action.

18. The method of claim 17, wherein the one or more operating parameters include at least one of an altitude, a Mach number, and a flight phase.

19. The method of claim 17, wherein the power level change is a power level increase, and wherein one of the one or more predetermined operating parameters is a dwell time range, wherein the dwell time range is indicative of a predetermined range of times in which the turbine engine dwells prior to the power level increase.

20. A system for identifying a rub event between a rotating component and a stationary component of a turbine engine, the system comprising:
one or more computing devices comprising one or more processors and one or more memory devices, the one or more memory devices storing instructions that when executed by the one or more processors cause the one or more processors to perform operations, the operations comprising:
comparing one or more data points to a severity threshold, each data point of the one or more data points is defined a magnitude and a rate of a power level change performed by the turbine engine during operation, wherein the data points beyond the severity threshold are identified as possible rub events; and
performing, in response to the particular data point being identified as being associated with the possible rub event, a control action.

* * * * *